United States Patent
Kang et al.

(10) Patent No.: US 10,818,440 B2
(45) Date of Patent: Oct. 27, 2020

(54) PSEUDOCAPACITIVE CONDUCTIVE COMPOSITE, COMPOSITE INCLUDING SUB-NANOSCALE PARTICLES, AND AQUEOUS HYBRID CAPACITOR INCLUDING THE SAME AS ELECTRODE ACTIVE MATERIAL

(71) Applicant: KOREA ADVANCED INSTITUTE OF SCIENCE AND TECHNOLOGY, Daejeon (KR)

(72) Inventors: Jeung Ku Kang, Daejeon (KR); Il Woo Ock, Daejeon (KR)

(73) Assignee: Korea Advanced Institute of Science and Technology, Yuseong-Gu, Daejoen (KR)

(*) Notice: Subject to any disclaimer, the term of this patent is extended or adjusted under 35 U.S.C. 154(b) by 92 days.

(21) Appl. No.: 16/018,325

(22) Filed: Jun. 26, 2018

(65) Prior Publication Data
US 2019/0341199 A1    Nov. 7, 2019

(30) Foreign Application Priority Data
May 3, 2018 (KR) .................... 10-2018-0051482

(51) Int. Cl.
| | |
|---|---|
| H01G 11/04 | (2013.01) |
| H01G 11/48 | (2013.01) |
| H01G 11/36 | (2013.01) |
| H01G 11/46 | (2013.01) |

(52) U.S. Cl.
CPC ............ *H01G 11/04* (2013.01); *H01G 11/36* (2013.01); *H01G 11/46* (2013.01); *H01G 11/48* (2013.01)

(58) Field of Classification Search
CPC ........ H01G 11/04; H01G 11/06; H01G 11/22; H01G 11/36; H01G 11/46
See application file for complete search history.

(56) References Cited

U.S. PATENT DOCUMENTS

2016/0172120 A1* 6/2016 Kang .................. H01G 11/36
429/231.4

FOREIGN PATENT DOCUMENTS

KR    101426493 B1    8/2014

OTHER PUBLICATIONS

Il Woo Ock et al, "Homogeneously Ordered Morphologies to Reduce the Gap between the Anode and Cathode of Asymmetric Hybrid Capacitors with High Energy Density," HyMaP 2017, Nov. 5, 2017, 3 pages.

Il Woo Ock et al, "Synthesis of Pseudocapacitive Polymer Chain Anode and Subnanoscale Metal Oxide Cathode for Aqueous Hybrid Capacitors Enabling High Energy and Power Densities along with Long Cycle Life," Advanced Energy Materials 2018, Jan. 15, 2018, 8 pages.

(Continued)

*Primary Examiner* — Eric W Thomas
(74) *Attorney, Agent, or Firm* — Hamre, Schumann, Mueller & Larson, P.C.

(57) ABSTRACT

The present disclosure relates to a pseudocapacitive conductive composite including conductive polymer chains formed on a graphene sheet, a composite for an electrode including sub-nanoscale particles of a metal oxide or metal sulfide formed on a graphene sheet, and an aqueous hybrid capacitor including the composites as electrode active materials.

11 Claims, 14 Drawing Sheets

(56) References Cited

OTHER PUBLICATIONS

Se Yun Kim et al., "Nickel oxide encapsulated nitrogen-rich carbon hollow spheres with multiporosity for high-performance pseudocapacitors having extremely robust cycle life," Energy & Environmental Science, vol. 8, No. 1, pp. 188-194, Oct. 8, 2014.

Zhi Li et al., "Colossal pseudocapacitance in a high functionality-high surface area carbon anode doubles the energy of an asymmetric supercapacitor," Energy & Environmental Science, vol. 7, pp. 1708-1718, Feb. 4, 2014.

Juan Yang et al., "3D Architecture Materials Made of NiCoAl-LDH Nanoplates Coupled with NiCo-Carbonate Hydroxide Nanowires Grown on Flexible Graphite Paper for Asymmetric Supercapacitors," Advanced Energy Materials, vol. 4, Aug. 13, 2014, 8 pages.

Rahul R. Salunkhe et al., "Large-scale synthesis of coaxial carbon nanotube/Ni(OH)2 composites for asymmetric supercapacitor application," Nano Energy, vol. 11, pp. 211-218, Oct. 22, 2014.

Rahul R. Salunkhe et al., "Asymmetric Supercapacitors Using 3D Nanoporous Carbon and Cobalt Oxide Electrodes Synthesized from a Single Metal-Organic Framework," ACSNANO, vol. 9, No. 6, pp. 6288-6296, May 15, 2015.

Laifa Shen et al., "NiCo2S4 Nanosheets Grown on Nitrogen-Doped Carbon Foams as an Advanced Electrode for Supercapacitors," Advanced Energy Materials, vol. 5, Oct. 17, 2014, 7 pages.

Juan Yang et al., "Electroactive edge site-enriched nickel-cobalt sulfide into graphene frameworks for high-performance asymmetric supercapacitors," Energy & Environmental Science, vol. 9, pp. 1299-1307, Jan. 14, 2016.

Jia-Yan Luo et al., "Aqueous Lithium-ion Battery LiTi2(PO4)3/LiMn2O4 with High Power and Energy Densities as well as Superior Cycling Stability," Advanced Functional Materials, vol. 17, pp. 3877-3884, Nov. 26, 2017.

Nengfei Yu et al., "Electrodeposited PbO2 thin film as positive electrode in PbO2/AC hybrid capacitor," Electrochimica Acta 54 (2009) pp. 3835-3841, Feb. 10, 2009.

Jia-Yan Luo et al., "Raising the cycling stability of aqueous lithium-ion batteries by eliminating oxygen in the electrolyte," nature chemistry, vol. 2, pp. 760-765, Aug. 8, 2010.

Mauro Pasta et al., "A high-rate and long cycle life aqueous electrolyte battery for grid-scale energy storage," nature Communications, Oct. 23, 2012, 7 pages.

Mauro Pasta et al., "Full open-framework batteries for stationary energy storage," nature Communications, Jan. 6, 2014, 9 pages.

Kai Zhang et al., "Graphene/Polyaniline Nanofiber Composites as Supercapacitor Electrodes," Chemistry of Materials, vol. 22, pp. 1392-1401, Jan. 27, 2010.

Hyung Mo Jeong et al., "Rescaling of metal oxide nanocrystals for energy storage having high capacitance and energy density with robust cycle life," PNAS, vol. 112, No. 26, pp. 7914-7919, Jun. 30, 2015.

Zenghui Qiu et al., "High-performance asymmetric supercapacitor with ultrahigh energy density based on hierarchical graphene sheets@NiO core-shell nanosheets and 3D drilled graphene sheets hydrogel," Journal of Alloys and Compounds, vol. 727, pp. 1189-1202, Aug. 31, 2017.

\* cited by examiner

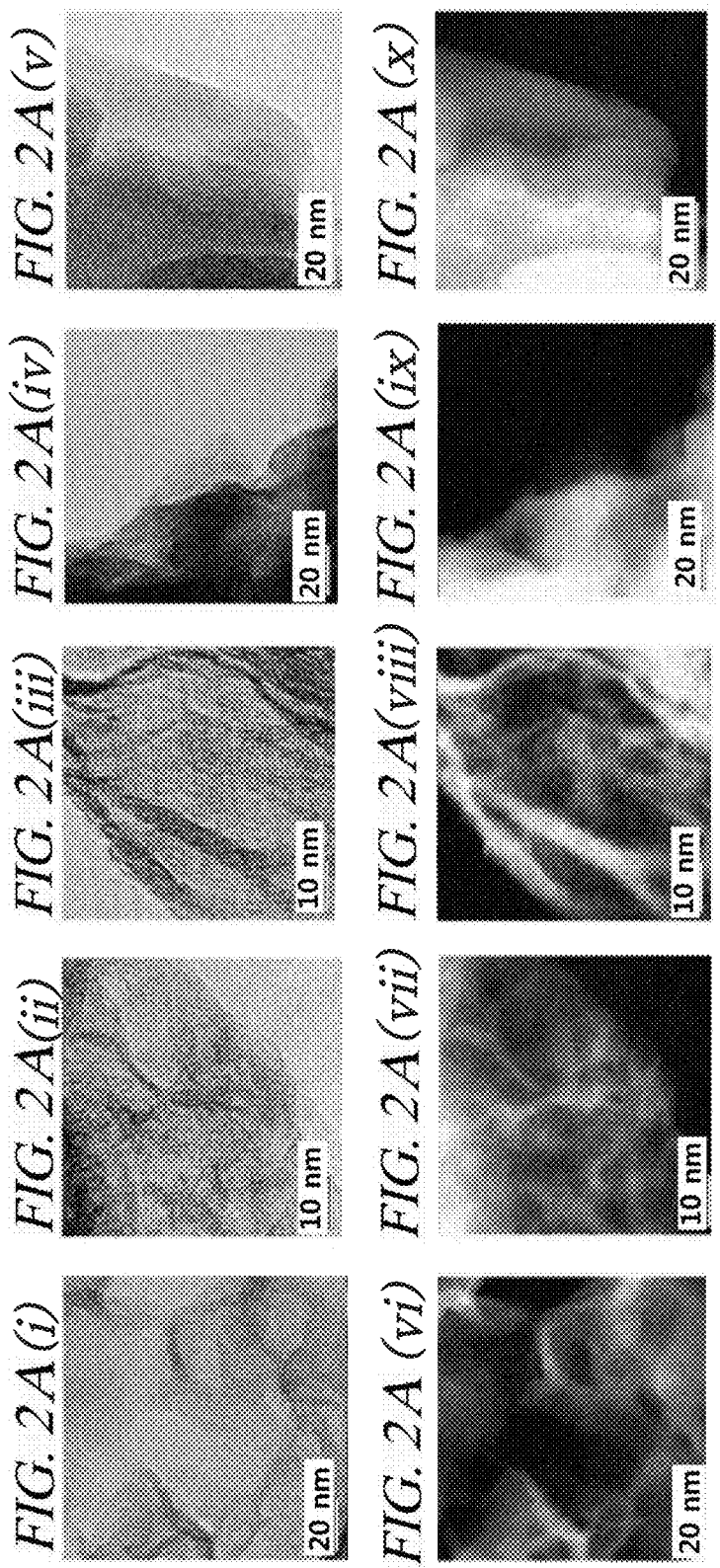

BEFORE RESCALING

AFTER RESCALING

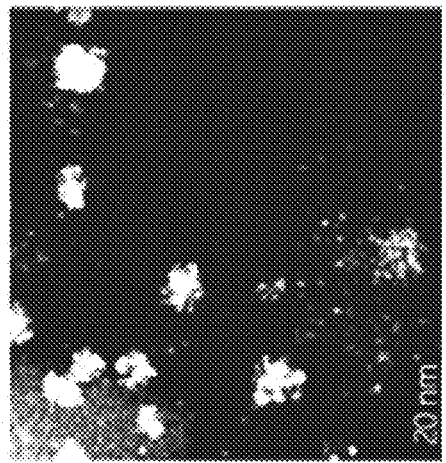
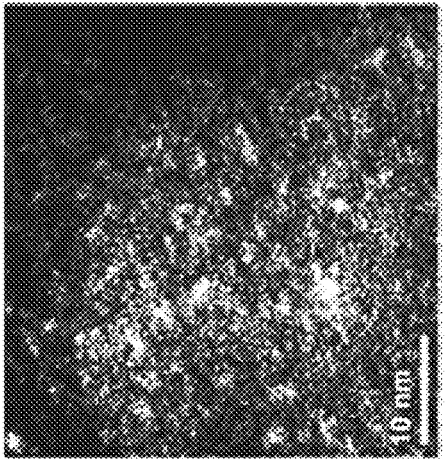
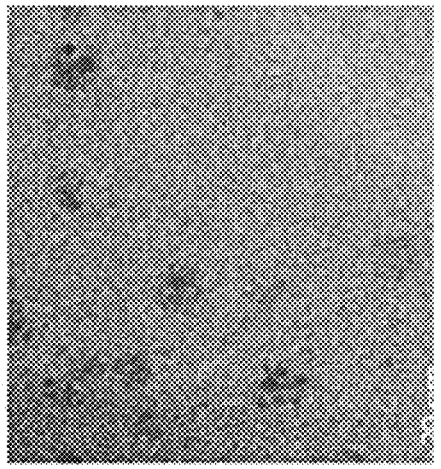
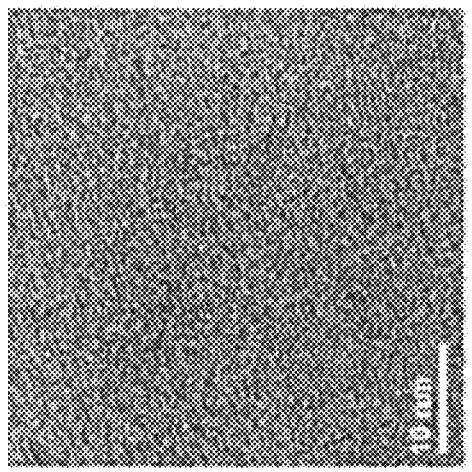
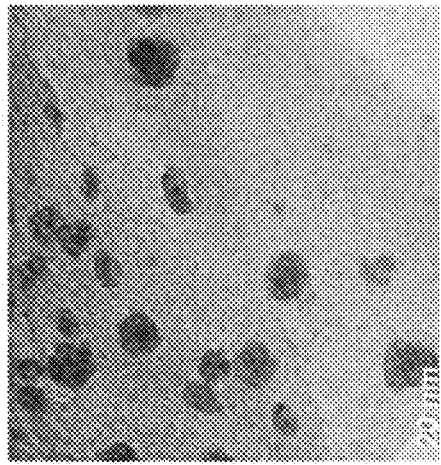
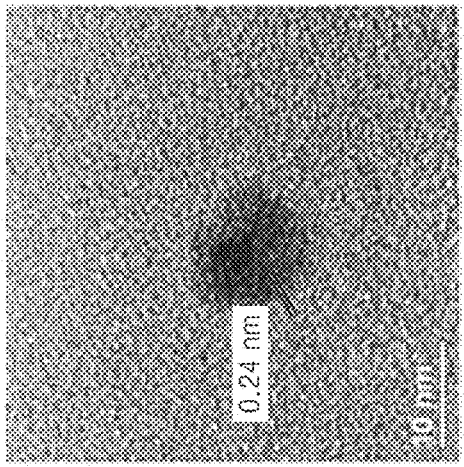

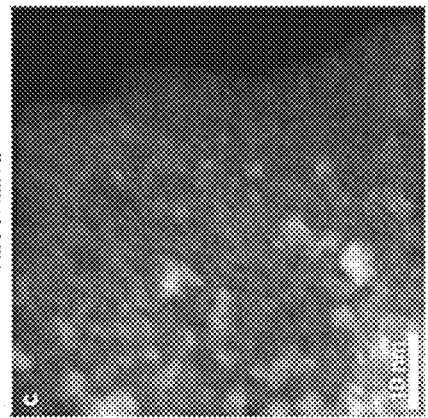
FIG. 8C RESCALING
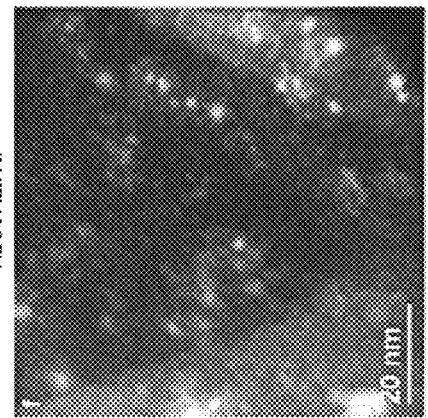
FIG. 8F RESCALING
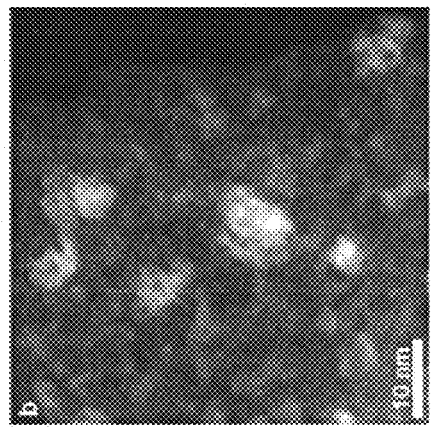
FIG. 8B PRISTINE
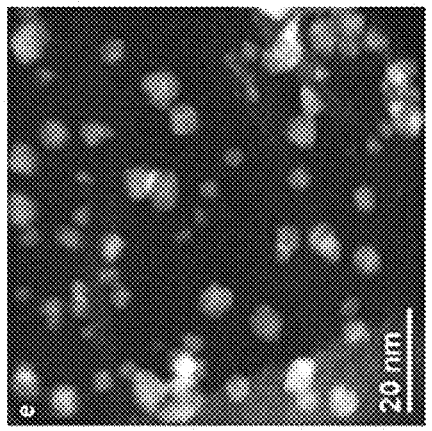
FIG. 8E PRISTINE
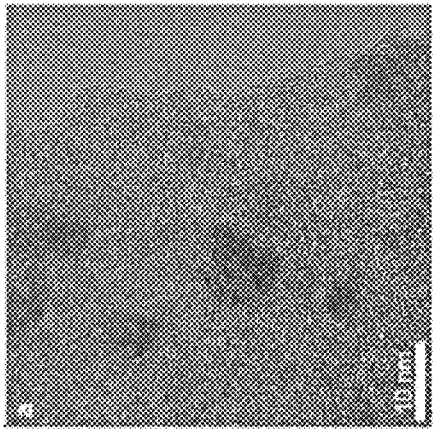
FIG. 8A PRISTINE
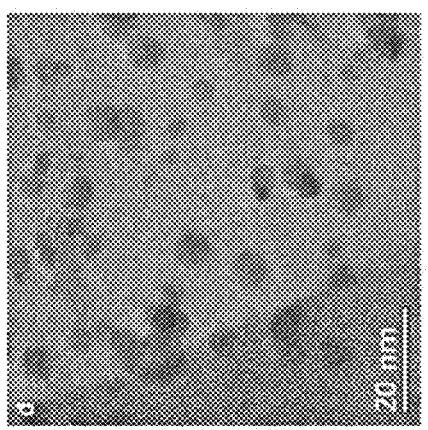
FIG. 8D PRISTINE

PSEUDOCAPACITIVE CONDUCTIVE COMPOSITE, COMPOSITE INCLUDING SUB-NANOSCALE PARTICLES, AND AQUEOUS HYBRID CAPACITOR INCLUDING THE SAME AS ELECTRODE ACTIVE MATERIAL

CROSS-REFERENCE TO RELATED APPLICATION

This application claims the benefit under 35 USC 119(a) of Korean Patent Application No. 10-2018-0051482 filed on May 3, 2018, in the Korean Intellectual Property Office, the entire disclosures of which are incorporated herein by reference for all purposes.

TECHNICAL FIELD

The present disclosure relates to a pseudocapacitive conductive composite including conductive polymer chains formed on a graphene sheet, a composite for an electrode including sub-nanoscale particles of a metal oxide or metal sulfide formed on a graphene sheet, and an aqueous hybrid capacitor including the composites as electrode active materials.

BACKGROUND

Aqueous electrochemical energy storages have been attracting a lot of attention due to their high stability and eco-friendly characteristics. However, they must satisfy very strict standards on energy and power density over long-term repeated charge/discharge cycles. In the present disclosure, the present inventors will report a strategy to implement a high-performance aqueous hybrid capacitor (AHC) using pseudocapacitive anode and cathode. Polymer chains which are synthesized by in-situ polymerization of polyaniline on a reduced graphene sheet show fiber-like morphologies and the redox-reactive surface area allowing high capacitance as anode materials even at a high current density of 20 A/g and a high loading of ~6 mg·cm$^{-2}$. Further, sub-nanoscale metal oxide particles on graphene are used as pseudocapacitive cathode materials and show capacitance about three times higher than nanocrystals of ~10 nm. Furthermore, assembling these polymer chain anode and sub-nanoscale metal oxide cathode in full-cell AHCs is shown to maintain ~100% capacitance over 10,000 redox cycles and give a high energy density exceeding those of aqueous batteries. Moreover, AHCs show a high power density that enables ultrafast charging, and, thus, a switching wearable display kit using two AHCs connected in series can be charged within several seconds by a flexible photovoltaic module and a USB switching charger.

Nowadays an electrochemical energy storage system (ESS) is an essential part in various fields from portable devices to electric cars. However, the currently dominating ESS remains on lithium-ion batteries (LIBs) that operate in environmentally toxic and inflammable organic solvents to ensure high voltages for excellent energy densities and still has problems of low power density and slow charging rate. Aqueous capacitors have been developed to overcome these fundamental problems which began with electric double-layer capacitors (EDLCs) using porous carbon materials and lead to a battery-type pseudocapacitor that stores ions using redox reactions. EDLC-type carbon materials allow low ion absorption/desorption capacity in their electric double-layers. Meanwhile, a metal oxide can be one of promising candidates to implement a positive electrode for atom-by-ion redox reactions, but fast charging/discharging makes it impossible to achieve its full capacitance. Further, a metal oxide typically has long ion diffusion lengths and low electrical conductivity during redox reactions. As a result, this leads to fast capacitance fading and thus results in short cycle life. The implementation of metal oxide particles with several nanometer-scale sizes has been suggested as one of promising solutions to shorten a diffusion length. The problem is that particles with nanometer-scale sizes are agglomerated during repeated redox cycles and thus eventually cause the capacitance fading during repeated charging/discharging cycles. Therefore, new electrode structures or methodologies capable of suppressing the agglomeration of electrode materials may enable robust capacitance retention during repeated charging/discharging cycles. Further, the low electrical conductivity of pristine metal oxide materials can be improved by their combination with an electrically conductive substrate. Furthermore, eco-friendly and low-cost AHCs formed of two different negative and positive electrode materials allow an operation potential window suitable for achieving high energy density. However, most of AHCs were focused on improving the specific capacitances of the both electrodes since very few pseudocapacitive materials have been developed as negative electrodes. Consequently, the above-described strategy to implement high energy and high power densities along with long cycle life for AHCs still needs to be developed due to the capacitance loss of the negative electrode material and the capacitance fading of the positive electrode during repeated redox cycles.

PRIOR ART DOCUMENT

Korean Patent No. 10-1426493

SUMMARY

In view of the foregoing, the present disclosure provides a pseudocapacitive conductive composite including conductive polymer chains formed on a graphene sheet, a composite for an electrode including sub-nanoscale particles of a metal oxide or metal sulfide formed on a graphene sheet, and an aqueous hybrid capacitor including the composites as electrode active materials.

However, problems to be solved by the present disclosure are not limited to the above-described problems. Although not described herein, other problems to be solved by the present disclosure can be clearly understood by those skilled in the art from the following descriptions.

A first aspect of the present disclosure provides an aqueous hybrid capacitor including an anode including conductive polymer chains formed on a graphene sheet, a cathode including sub-nanoscale particles of a metal oxide or metal sulfide formed on a graphene sheet, and an aqueous electrolyte.

A second aspect of the present disclosure provides a pseudocapacitive conductive composite including conductive polymer chains formed on a graphene sheet.

A third aspect of the present disclosure provides a composite for an electrode including sub-nanoscale particles of a metal oxide or metal sulfide formed on a graphene sheet.

A fourth aspect of the present disclosure provides a method for preparing a composite for an electrode including forming nanoparticles of a metal oxide or metal sulfide on a graphene sheet, and by lithiation of the nanoparticles of the metal oxide or metal sulfide formed on the graphene sheet to rescale the nanoparticles into a sub-nanoscale size so as to form sub-nanoscale particles of the metal oxide or metal sulfide.

In embodiments of the present disclosure, high-performance AHCs on a new paradigm structure for pseudocapacitive anode and cathode is demonstrated, wherein polymer chains and sub-nanoscale metal oxide or metal sulfide pseudocapacitive materials are used as an anode and a cathode for a hybrid capacitor in an eco-friendly and stable aqueous electrolyte. Assembling the cathode and the anode is shown to exhibit high energy density equivalent to those of aqueous batteries, excellent capacitance retention over long cycle life of 100,000 or more charging/discharging cycles, and ultrafast charging capacity caused by about 100 times higher power density than those of aqueous batteries.

In embodiments of the present disclosure, if a pseudocapacitive conductive composite including conductive polymer chains formed on a graphene sheet such as rGO is used as an anode of the hybrid capacitor, the conductive polymer chains such as polyaniline (PANI) conjugated well on the graphene sheet such as the rGO induce the high specific capacitance even at a high mass loading.

In embodiments of the present disclosure, there is provided an aqueous hybrid capacitor (AHC) including an anode including conductive polymer chains formed on a graphene sheet; a cathode including sub-nanoscale particles of a metal oxide or metal sulfide formed on a graphene sheet; and an aqueous electrolyte, and the capacitor can provide ultrafast charging capacity with excellent capacitance retention over long cycle life of 100,000 or more charging/discharging cycles and high power density and also provide a wide operation potential due to the morphologies and electrical characteristics of the composites used as the anode and the cathode, respectively.

In embodiments of the present disclosure, AHCs in full-cell configurations of the polymer-based anode and the sub-nanoscale metal oxide-based cathode can provide a high energy density exceeding those of aqueous batteries.

In embodiments of the present disclosure, size reduction of nanoparticles of a metal oxide or metal sulfide formed on graphene to a sub-nanoscale size via lithiation-induced rescaling can provide the enhancement in specific capacitance of the AHC by about three or more times.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIGS. 2A(i)-2A(x) and FIGS. 2B-2G show characterizations of PANIx/rGO versus the amounts of PANI chains according to an example of the present disclosure. FIGS. 2A(i)-2A(v) show TEM images for (i) x=6.25, (ii) x=12.5, (iii) x=25, (iv) x=75, and (v) x=125. FIGS. 2A(vi)-2A(x) show STEM images for (vi) x=6.25, (vii) x=12.5, (viii) x=25, (ix) x=75, and (x) x=125. FIG. 2B shows PXRD patterns. FIG. 2C shows Raman spectra with A=514 nm. FIG. 2D shows XPS N1s spectra. FIG. 2E shows electrochemical performance of an optimized anode ($PANI_{12.5}$/rGO) of CV curves. FIG. 2F shows galvanostatic charge-discharge measurements. FIG. 2G shows gravimetric specific capacitances.

FIG. 3A shows the TEM images for x=6.25. FIG. 3B shows the TEM images for x=12.5. FIG. 3C shows the TEM images for x=25. FIG. 3D shows the TEM images for x=75. FIG. 3E shows the TEM images for x=125.

FIG. 5A shows the single NiO nanoparticle attached on rGO. FIG. 5B shows the morphology obtained after lithiation-induced rescaling, and herein the images of NiO particles before and after rescaling were obtained at the same position.

FIG. 5C shows CV curves. FIG. 5D shows galvanostatic charge-discharge measurements. FIG. 5E shows gravimetric specific capacitances.

FIGS. 7A-7F show TEM and STEM images of 10-nm NiO particles dispersed on the rGO and a single NiO particle according to an example of the present disclosure, and the images of NiO particles before and after rescaling are obtained at the same position. FIGS. 7A and 7D show TEM images before rescaling. FIGS. 7B and 7E show TEM images after rescaling. FIGS. 7C and 7F show STEM mapping images (temperature mode) of 10-nm NiO particles rescaled on the rGO and a single NiO particle after rescaling.

FIG. 8A shows a TEM image of 10-nm $Fe_2O_3$ particles dispersed on the rGO. FIG. 8B shows STEM images of $Fe_2O_3$ particle before rescaling. FIG. 8C shows after rescaling. FIG. 8D shows a TEM image of 10-nm $MnO_2$ particles dispersed on the rGO. FIG. 8E shows STEM images of $MnO_2$ particles before rescaling. FIG. 8F shows after rescaling according to an example of the present disclosure.

FIG. 9B shows a galvanostatic charge-discharge profile in the potential range of from 0 V to 1.55 V. FIG. 9C shows CV curves. FIG. 9D shows galvanostatic charge-discharge measurements. FIG. 9E shows gravimetric specific capacitances. FIG. 9F shows cycling stability and Coulombic efficiency of the AHC at a current density of 5 $Ag^{-1}$. FIG. 9G shows Ragone plots for energy storage performance of the AHC according to an example of the present disclosure at different current densities in comparison with results of other conventional AHCs (indicated by triangles) and conventional aqueous batteries (indicated by squares). FIG. 9H shows an LED powered by two AHCs connected in series and charged with the flexible photovoltaic-charging wearable kit coin cell charger for 20 seconds according to an example of the present disclosure.

FIG. 10A shows before charge-discharge cycle. FIG. 10B shows after 80,000 charge-discharge cycles at a current density of 5 $Ag^{-1}$.

DETAILED DESCRIPTION

Figure 1A:
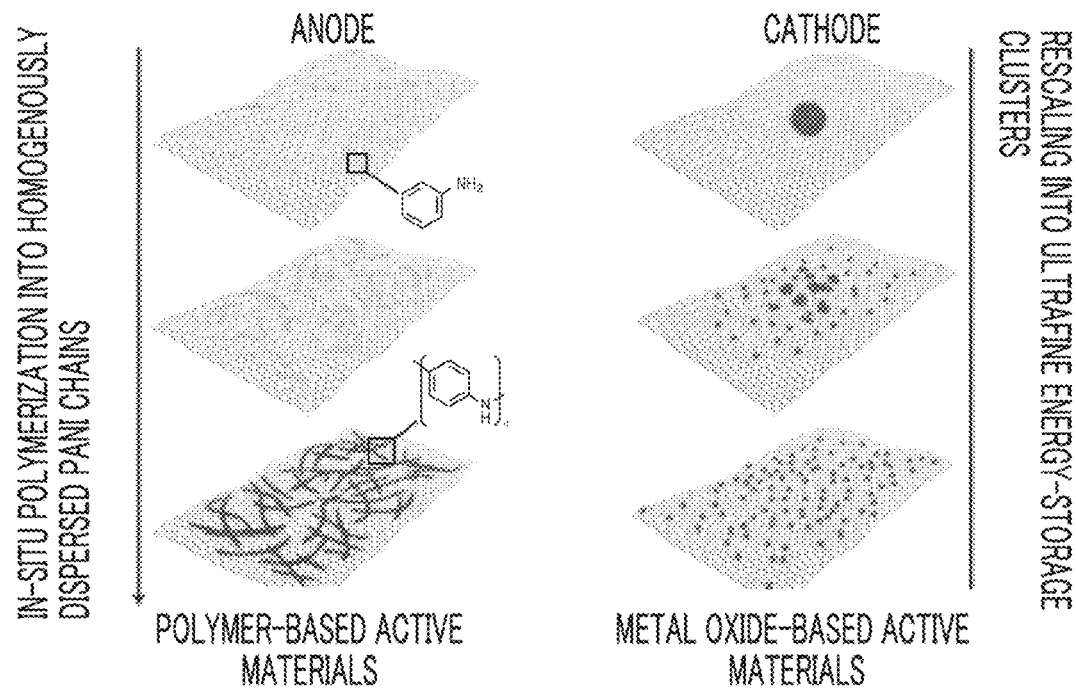
FIG. 1A shows a schematic diagram for a synthetic method of a polymer chain-based anode material (PANIx/rGO) and a sub-nanoscale metal oxide-based cathode material (rescaled NiO/rGO)

Hereinafter, embodiments and examples of the present disclosure will be described in detail with reference to the accompanying drawings so that the present disclosure may be readily implemented by those skilled in the art. However, it is to be noted that the present disclosure is not limited to the embodiments and examples but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the term "on" that is used to designate a position of one element with respect to another element includes both a case that the one element is adjacent to the other element and a case that any other element exists between these two elements.

Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

Through the whole document, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party.

Through the whole document, the term "step of" does not mean "step for".

Through the whole document, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through the whole document, a phrase in the form "A and/or B" means "A or B, or A and B".

Hereinafter, embodiments and examples of the present disclosure will be described in detail with reference to the accompanying drawings. However, the present disclosure may not be limited to the following embodiments, examples, and drawings.

A first aspect of the present disclosure provides an aqueous hybrid capacitor including an anode including conductive polymer chains formed on a graphene sheet, a cathode including sub-nanoscale particles of a metal oxide or metal sulfide formed on a graphene sheet, and an aqueous electrolyte.

In an embodiment of the present disclosure, the anode includes the conductive polymer chains formed on the graphene sheet as electrode active materials, and the cathode includes the sub-nanoscale particles of a metal oxide or metal sulfide formed on the graphene sheet as electrode active materials.

In an embodiment of the present disclosure, the conductive polymer chains act as redox reactive sites for cations in the anode.

In an embodiment of the present disclosure, the metal oxide or metal sulfide particles formed on the graphene sheet provide a lot of active sites for atom-by-ion redox reactions in the cathode.

In an embodiment of the present disclosure, the aqueous electrolyte is positioned between the anode and the cathode facing each other.

In an embodiment of the present disclosure, the conductive polymer chains may have a form of fiber, but may not be limited thereto.

In an embodiment of the present disclosure, the conductive polymer chains may include a conductive polymer selected from the group consisting of polyanilines, polypyrroles, polythiophenes, poly[3-methylthiophene], poly[3,4-ethylendioxythiophene](PEDOT), and derivatives thereof, but may not be limited thereto.

In an embodiment of the present disclosure, the sub-nanoscale particles may include the oxide or sulfide containing at least one metal element selected from the group consisting of Ni, Fe, Co, Ge, Sn, Mn, Ti, V, Cu, Zn, W, Ag, Pt, Ga, P, Au, Sb, Te, Pb, Bi, Mo and Cd, but may not be limited thereto.

In an embodiment of the present disclosure, a width of the fiber of the conductive polymer chains may be from about 1 nm to about 10 nm, but may not be limited thereto. For example, the width of the fiber of the conductive polymer chains may be from about 1 nm to about 10 nm, from about 1 nm to about 9 nm, from about 1 nm to about 8 nm, from about 1 nm to about 7 nm, from about 1 nm to about 6 nm, from about 1 nm to about 5 nm, from about 1 nm to about 4 nm, from about 1 nm to about 3 nm, or from about 1 nm to about 2 nm, but may not be limited thereto.

In an embodiment of the present disclosure, a weight ratio of the graphene sheet to the conductive polymer chains may include from about 1:about 0.01 to about 1:about 1, but may not be limited thereto. For example, the weight ratio of the graphene sheet to the conductive polymer chains may be from about 1:about 0.01 to about 1:about 1, from about 1:about 0.01 to about 1:about 0.9, from about 1:about 0.01 to about 1:about 0.8, from about 1:about 0.01 to about 1:about 0.7, from about 1:about 0.01 to about 1:about 0.6, from about 1:about 0.01 to about 1:about 0.5, from about 1:about 0.01 to about 1:about 0.4, from about 1:about 0.01 to about 1:about 0.3, from about 1:about 0.01 to about 1:about 0.2, from about 1:about 0.01 to about 1:about 0.1, from about 1:about 0.05 to about 1:about 1, from about 1:about 0.1 to about 1:about 1, from about 1:about 0.2 to about 1:about 1, from about 1:about 0.4 to about 1:about 1, from about 1:about 0.6 to about 1:about 1, or from about 1:about 0.8 to about 1:about 1, but may not be limited thereto.

In an embodiment of the present disclosure, a weight ratio of the graphene sheet to the sub-nanoscale particles may include from about 1:about 0.01 to about 1:about 0.5, but may not be limited thereto. For example, the weight ratio of the graphene sheet to the sub-nanoscale particles may be from about 1:about 0.01 to about 1:about 0.5, from about 1:about 0.01 to about 1:about 0.4, from about 1:about 0.01 to about 1:about 0.3, from about 1:about 0.01 to about 1:about 0.2, from about 1:about 0.01 to about 1:about 0.1, from about 1:about 0.02 to about 1:about 0.5, from about 1:about 0.04 to about 1:about 0.5, from about 1:about 0.06 to about 1:about 0.5, from about 1:about 0.08 to about 1:about 0.5, from about 1:about 0.1 to about 1:about 0.5, or from about 1:about 0.2 to about 1:about 0.5, but may not be limited thereto.

A second aspect of the present disclosure provides a pseudocapacitive conductive composite including conductive polymer chains formed on a graphene sheet.

In an embodiment of the present disclosure, the conductive polymer chains may have a fiber form, but may not be limited thereto.

In an embodiment of the present disclosure, the conductive polymer chains may include a conductive polymer selected from the group consisting of polyanilines, polypyrroles, polythiophenes, poly[3-methylthiophene], poly[3,4-ethylendioxythiophene](PEDOT), and derivatives thereof, but may not be limited thereto.

In an embodiment of the present disclosure, the conductive composite may be prepared by in-situ polymerization of the conductive polymer forming monomer on the graphene sheet, but may not be limited thereto.

In an embodiment of the present disclosure, a monomer for forming the conductive polymer may include a member selected from the group consisting of aniline, pyrrole, thiophene, 3-methylthiophene, 3,4-ethylendioxythiophene and derivatives thereof, but may not be limited thereto.

In an embodiment of the present disclosure, a weight of the conductive polymer chains is determined by a weight of the monomer used for forming the conductive polymer. Therefore, after the polymerization, a weight ratio of the graphene sheet to the conductive polymer chains may include from about 1:about 0.01 to about 1:about 1, but may not be limited thereto. For example, the weight ratio of the graphene sheet to the conductive polymer chains may be from about 1:about 0.01 to about 1:about 1, from about 1:about 0.01 to about 1:about 0.9, from about 1:about 0.01 to about 1:about 0.8, from about 1:about 0.01 to about 1:about 0.7, from about 1:about 0.01 to about 1:about 0.6, from about 1:about 0.01 to about 1:about 0.5, from about 1:about 0.01 to about 1:about 0.4, from about 1:about 0.01 to about 1:about 0.3, from about 1:about 0.01 to about 1:about 0.2, from about 1:about 0.01 to about 1:about 0.1, from about 1:about 0.05 to about 1:about 1, from about 1:about 0.1 to about 1:about 1, from about 1:about 0.2 to about 1:about 1, from about 1:about 0.4 to about 1:about 1, from about 1:about 0.6 to about 1:about 1, or from about 1:about 0.8 to about 1:about 1, but may not be limited thereto.

In an embodiment of the present disclosure, the graphene sheet may include a reduced graphene oxide (rGO) sheet, but may not be limited thereto.

In an embodiment of the present disclosure, a width of the fiber of the conductive polymer chains may be from about 1 nm to about 10 nm, but may not be limited thereto. For example, the width of the fiber of the conductive polymer chains may be from about 1 nm to about 10 nm, from about 1 nm to about 9 nm, from about 1 nm to about 8 nm, from about 1 nm to about 7 nm, from about 1 nm to about 6 nm, from about 1 nm to about 5 nm, from about 1 nm to about 4 nm, from about 1 nm to about 3 nm, or from about 1 nm to about 2 nm, but may not be limited thereto. If the width of the conductive polymer chains is greater than the above-described range, it causes the problem that the conductive polymer chains cannot maintain the fiber form.

A third aspect of the present disclosure provides a composite for an electrode including sub-nanoscale particles of a metal oxide or metal sulfide formed on a graphene sheet.

In an embodiment of the present disclosure, the sub-nanoscale particles may include the oxide or sulfide containing at least one metal element selected from the group consisting of Ni, Fe, Co, Ge, Sn, Mn, Ti, V, Cu, Zn, W, Ag, Pt, Ga, P, Au, Sb, Te, Pb, Bi, Mo and Cd, but may not be limited thereto.

In an embodiment of the present disclosure, a weight ratio of the graphene sheet to the sub-nanoscale particles may include from about 1:about 0.01 to about 1:about 0.5, but may not be limited thereto. For example, the weight ratio of the graphene sheet to the metal oxide or metal sulfide sub-nanoscale particles maybe from about 1:about 0.01 to about 1:about 0.5, from about 1:about 0.01 to about 1:about 0.4, from about 1:about 0.01 to about 1:about 0.3, from about 1:about 0.01 to about 1:about 0.2, from about 1:about 0.01 to about 1:about 0.1, from about 1:about 0.02 to about 1:about 0.5, from about 1:about 0.04 to about 1:about 0.5, from about 1:about 0.06 to about 1:about 0.5, from about 1:about 0.08 to about 1:about 0.5, from about 1:about 0.1 to about 1:about 0.5, or from about 1:about 0.2 to about 1:about 0.5, but may not be limited thereto.

In an embodiment of the present disclosure, the sub-nanoscale particles may be formed by lithiation of nanoparticles of the metal oxide or metal sulfide formed on the graphene sheet to rescale the nanoparticles of the metal oxide or metal sulfide in sub-nanoscale particles, but may not be limited thereto.

In an embodiment of the present disclosure, the composite for an electrode may be used as an anode of a capacitor, but may not be limited thereto.

A fourth aspect of the present disclosure provides a method for preparing a composite including forming nanoparticles of a metal oxide or metal sulfide on a graphene sheet, and by lithiation of the nanoparticles of the metal oxide or metal sulfide formed on the graphene sheet to rescale the nanoparticles into a sub-nanoscale size so as to form sub-nanoscale particles of the metal oxide or metal sulfide.

In an embodiment of the present disclosure, the lithiation of the nanoparticles of metal oxide or metal sulfide formed on the graphene sheet may be performed at a constant current in the range of from about 0.001 V to about 3 V vs. Li$^+$/Li, but may not be limited thereto.

In an embodiment of the present disclosure, the formation of the nanoparticles of metal oxide on the graphene sheet may include loading a metal oxide precursor on the graphene sheet, reducing the metal oxide precursor by thermochemical vapor deposition under a reducing gas atmosphere followed by oxidizing under an oxidizing gas atmosphere so as to obtain the nanoparticles of the metal oxide formed on the graphene sheet, but may not be limited thereto.

In an embodiment of the present disclosure, the sub-nanoscale particles may include the oxide or sulfide containing at least one metal element selected from the group consisting of Ni, Fe, Co, Ge, Sn, Mn, Ti, V, Cu, Zn, W, Ag, Pt, Ga, P, Au, Sb, Te, Pb, Bi, Mo and Cd, but may not be limited thereto.

In an embodiment of the present disclosure, a weight ratio of the graphene sheet to the sub-nanoscale particles may include from about 1:about 0.01 to about 1:about 0.5, but may not be limited thereto. For example, the weight ratio of the graphene sheet to the sub-nanoscale particles may be from about 1:about 0.01 to about 1:about 0.5, from about 1:about 0.01 to about 1:about 0.4, from about 1:about 0.01 to about 1:about 0.3, from about 1:about 0.01 to about 1:about 0.2, from about 1:about 0.01 to about 1:about 0.1, from about 1:about 0.02 to about 1:about 0.5, from about 1:about 0.04 to about 1:about 0.5, from about 1:about 0.06 to about 1:about 0.5, from about 1:about 0.08 to about 1:about 0.5, from about 1:about 0.1 to about 1:about 0.5, or from about 1:about 0.2 to about 1:about 0.5, but may not be limited thereto.

In an embodiment of the present disclosure, high-performance AHCs on a new paradigm structure for pseudocapacitive anode and cathode will be demonstrated, polymer chains and sub-nanoscale metal oxide or metal sulfide pseudocapacitive materials are used as an anode and a cathode for a hybrid capacitor in an eco-friendly and stable aqueous electrolyte. Assembling the cathode and the anode is shown to exhibit high energy density equivalent to those of aqueous batteries, excellent capacitance retention over long cycle life of 100,000 or more charging/discharging cycles, and ultrafast charging capacity caused by about 100 times higher power density than those of aqueous batteries.

In an embodiment of the present disclosure, there is provided the aqueous hybrid capacitor (AHC) including an anode including conductive polymer chains formed on a graphene sheet; a cathode including sub-nanoscale particles of a metal oxide or metal sulfide formed on a graphene sheet; and an aqueous electrolyte, and the capacitor can provide ultrafast charging capacity with excellent capacitance retention over long cycle life of 100,000 or more charging/discharging cycles and high power density and also provide a wide operation potential due to the morphologies and electrical characteristics of the composites used as the anode and the cathode, respectively.

In embodiments of the present disclosure, size reduction of the nanoparticles of a metal oxide or metal sulfide formed on the graphene sheet to a sub-nanoscale size via lithiation-induced rescaling can provide the enhancement in specific capacitance of the AHC by about three or more times.

All the descriptions of the composite for an electrode in accordance with the third aspect of the present disclosure can be applied to the fourth aspect of the present disclosure, and the detailed descriptions of parts of the fourth aspect, which overlap with those of the third aspect, are omitted hereinafter, but the descriptions of the third aspect of the present disclosure may be identically applied to the fourth aspect of the present disclosure, even though they are omitted hereinafter.

Hereinafter, the present disclosure will be described in detail with reference to Examples, but may not be limited thereto.

Examples

Synthesis of Reduced Graphene Oxide (rGO)

The rGO was prepared via reduction of graphene oxide (GO). The GO was synthesized using the Hummers' method. For the reduction of the GO, 35 wt % of a hydrazine solution and 28 wt % of ammonium hydroxide were added to the GO solution in water (1 mg/1 ml) and then transferred to an oil bath with stirring at 95° C. for 20 hours. The product was filtered with 0.1 M hydrochloric acid (HCl) and distilled water several times for purification. The as-prepared sample was freeze-dried.

Synthesis of Polyaniline and Reduced Graphene Oxide Composite ($PANI_x$/rGO) as Anode Material PANIx/rGO composites were synthesized by in situ polymerization of aniline monomers. The synthesized rGO and x mM (x: 6.25 to 125) of the aniline monomers were dispersed in 1 M HCl for 1 hour, and a certain amount of ammonium persulfate (APS) was melted in 1 M HCl separately and stored in a refrigerator. The well-dispersed mixtures were transferred to an ice bath at from 0° C. to 4° C., subsequently stirred, and then an APS solution was poured into the mixtures rapidly, and the temperature was maintained for 4 hours. The synthesized compounds were filtered through an anodized aluminum oxide (Whatman, Anodisc™ 47 0.2 μm) filter paper several times with distilled water and ethanol. After the filtration, the as-prepared samples were freeze-dried. PANI and rGO composites according to the aniline amount were named PANIx/rGO. In the PANIx/rGO as a composite of PANI and rGO according to the aniline amount, a weight ratio of rGO:PANI was calculated as about 1:about 0.03 at x=6.25 (a), about 1:about 0.08 at x=12.5 (b), about 1:about 0.16 at x=25 (c), about 1:about 0.48 at x=75 (d), and about 1:about 0.8 at x=125 (e).

Synthesis of Rescaled NiO on Reduced Graphene Oxide (NiO/rGO) as Cathode Material 10-Nm NiO Nanoparticles on the rGO:

A GO solution in distilled water (1 mg/1 ml) was prepared by sonication and then an appropriate amount of nickel acetate (50 mM aqueous solution) was added to form nickel oxide (NiO) precursors on the graphene oxide sheets. The mixed solution was continuously stirred for 2 hours at 60° C., and 28 wt % of an ammonium hydroxide solution was added and then stirred for 3 hours. For a reduction reaction, a sodium borohydride aqueous solution was added and stirred overnight until the bubbles disappeared. The product was filtered several times using distilled water and freeze-dried overnight. NiO precursors formed on the reduced graphene sheets were reduced by thermal chemical vapor deposition (CVD) under 25 torr hydrogen pressure at 300° C. for 3 hours. Finally, an additional step was performed to oxidize NiO nanoparticles in air at 250° C. for 2 hours. NiO nanoparticles were deposited 36.9 wt % on graphene sheets, and the amounts were measured by thermo-gravimetric analysis (TGA).

Rescaling of NiO Particles on the rGO:

A lithiation process was performed to make sub-nanometer scales from the size of 10-nm NiO nanoparticles. The as-prepared powder of 10-nm NiO nanoparticles on the rGO was used as a working electrode of coin cells (CR 2032 type).

Slurry was prepared by mixing an N-methyl-2-pyrrolidone (NMP) solution with 10 wt % of well-dispersed polyvinylidene fluoride (PVDF) as a binder, pasted on a copper foil and then dried in a vacuum oven at 80° C. overnight. The test cell was assembled with a working electrode, a lithium metal as a counter electrode, a separator (Celgard) and an electrolyte composed of 1 M $LiPF_6$ in a mixture of ethylene carbonate (EC)/diethyl carbonate (DEC) (1:1 vol %) in an Ar-filled glove box. The rescaling process was performed using the galvanostatic measurement (Wonatech) between 0.001 to 3.0 V (vs. Li+/Li) at a scan rate of 50 m $As^{-1}$ of a charge-discharge cycle. After the lithiation process, the compound was collected and purified several times with distilled water and acetone to remove residual lithium ions and electrolyte. The weight of the NiO particles was measured by the TGA. The weight of NiO was measured using 34.1 wt % of the sample considering the charge balance between anode and cathode structures.

Characterization

The morphologies of the products were examined with a Cs-corrected transmission electron microscopy (Cs-TEM, JEOL, JEM-ARM200F). The powder X-ray diffraction (PXRD) patterns were measured with a SmartLab 0-2θ diffractometer (Rigaku) using Cu Kα1 radiation at 1200 W (40 kV, 30 mA)). The range of PXRD patterns were from 10° to 80° by a scan rate of 4° min$^{-1}$. The X-ray photoelectron spectroscopy (XPS) spectra were examined with a K-alpha (Thermo VG Scientific) equipped with an Al Kα microfocused monochromator (incident photon energy of 1486.6 eV). The Raman spectra were also obtained with a dispersive Raman spectrometer (Horiba Jobin Yvon, ARAMIS) with 514 nm of an Ar ion CW laser. The thermo-gravimetric analysis (TGA) was performed using a TG209F3 (Netzsch) by a temperature rising speed of 5° C. min$^{-1}$ from 20° C. to 800° C. Transmission electron microscopy (TEM) and scanning transmission electron microscopy (STEM) analyses were also performed on the samples at the same position to confirm morphology changes using a marked grid.

Characterization of Electrochemical Properties

Cyclic voltammetry (CV) and galvanostatic measurement were performed using an EC-Lab Bio-logic program of VSP potentiostat equipment (Bio-logic). The slurry for the anode was prepared by mixing 80 wt % of the as-prepared powder of PANIx/rGO, 10 wt % of carbon black (Super-p), and 10 wt % of PVDF binder dispersed in the NMP solution. Meanwhile, for the cathode, 90 wt % of the as-prepared powder and 10 wt % of PVDF binder were dispersed in the NMP solution. The slurry was pasted on a Ni foil and dried in a vacuum oven at 80° C. overnight. A three-electrode system was implemented via a Teflon cell kit composed of a working electrode (an anode and a cathode each), a platinum wire as a counter electrode, and a saturated calomel reference electrode in an aqueous electrolyte of 6 M KOH. The CV profiles were obtained in the range of an anodic operation voltage from −1 V to 0 V and a cathodic operation voltage from 0 V to 0.6 V. For the galvanostatic charge-discharge measurements, the anodic operation potential was from −1 V to 0 V, and the cathodic operation potential was from 0 V to 0.55 V. An asymmetric hybrid full-cell capacitor (AHC), which is a two-electrode system, was assembled with an anode and a cathode sandwiched by a separator (Whatman) and their electrochemical properties were measured at the operation voltage ranging from 0 V to 1.6 V for the CV, and from 0 V to 1.55 V for the galvanostatic measurements in the 6 M KOH aqueous electrolyte. The AHCs were examined using a weight of 1 mg~cm$^{-2}$ to 3 mg~cm$^{-2}$ each based on the total mass of the anode and the cathode ($m_{total}=m_{anode}+m_{cathode}$). For a high loading of an anode material, a weight of an active material was loaded from about 1 mg~cm$^{-2}$ to about 6 mg~cm$^{-2}$.

AHC Coin Cell Combined with Switching Charger

Charging kits were composed of a charging part and an LED-operating part, wherein the charging part was implemented using a charging source of a flexible photovoltaic or an USB charger. The circuit was designed to turn on an LED only when the switch was on, wherein two AHCs connected in series were charged for 20 seconds for the flexible photovoltaic module and 10 seconds for the USB charger. The maximum operation voltage of the flexible photovoltaic module is 3.5 V and the maximum operation current is about 50 mA. A 100 mW·cm$^{-2}$ AM 1.5 G Xenon lamp was illuminated as a light source of the flexible photovoltaic module. Further, the operation voltage of the USB coin cell charger is from 3 V to 3.5 V and the charge current is about 45 mA. The single coin cell was measured as having a weight of from about 3 mg~cm$^{-2}$ to about 4 mg~cm$^{-2}$ based on the total mass of the anode and the cathode ($m_{total}=m_{anode}+m_{cathode}$). The videos were taken for details (Supplementary movie S1 and movie S2).

High-performance AHCs on a new paradigm structure for pseudocapacitive anode and cathode were demonstrated, and polymer chains and sub-nanoscale metal oxide or metal sulfide pseudocapacitive materials were used as an anode and a cathode for a hybrid capacitor in an eco-friendly and stable aqueous electrolyte. Assembling the cathode and the anode exhibited high energy density equivalent to those of aqueous batteries, excellent capacitance retention over long cycle life of 100,000 or more charging/discharging cycles, and ultrafast charging capacity caused by about 100 times higher power density than those of aqueous batteries.

Figure 1B:
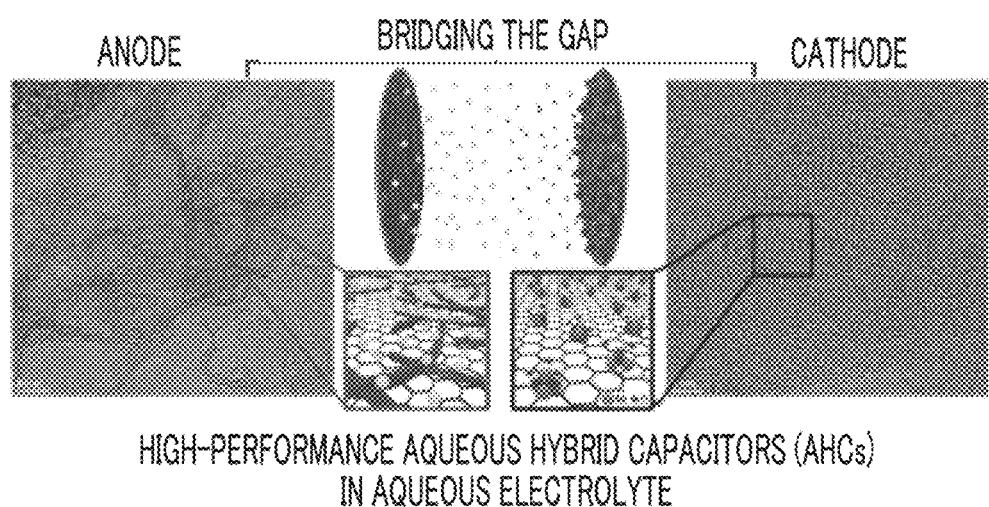
FIG. 1B shows schematic mechanisms and TEM images of $PANI_{12.5}$/rGO for the anode in a full-cell AHC and rescaled NiO/rGO for the cathode in the full-cell AHC according to an example of the present disclosure.

FIG. 1A shows schematic diagrams for synthetic methods of anode and cathode pseudocapacitive materials along with a strategy integrating both of anode and cathode structures in an aqueous electrolyte (KOH) for excellent electrochemical performance. FIG. 1B shows that the anode materials were synthesized by in-situ polymerization into homogeneously dispersed polymer chains on reduced graphene oxide (rGO) sheets and polyaniline (PANI) chains acted as redox-reactive sites for cations.

The left transmission electron microscopy (TEM) image in FIG. 1B shows the morphology of the homogeneously dispersed PANI on the rGO substrate. The interaction of the rGO with the PANI by π-π conjugation support formation of an electrically conductive network. The right transmission electron microscopy (TEM) image in FIG. 1B shows that reduction of nickel oxide (NiO) nanoparticles of from about 10 nm to sub-nanoscale sizes on the rGO substrate resulted in formation of large active sites for anions for atom-by-ion redox reactions. Further, AHCs formed using two different anode and cathode materials can achieve a wide operation potential.

As shown in FIGS. 1A-1B, FIGS. 2A(i)-2A(x) and FIGS. 3A-3E, PANI morphologies were confirmed by TEM and scanning transmission electron microscopy (STEM) images. As shown in FIGS. 2A(i)-2A(iii), FIGS. 2A(vi)-2A(viii), and FIGS. 3A-3C, in the PANI$_x$/rGO composites with x=6.25, 12.5, and 25, net-like fibers were cross-linked on the rGO surfaces and the fiber-like PANIs had the widths of from 2 nm to 4 nm for x=6.25 and 12.5 and from 5 nm to 7 nm for x=25. Meanwhile, as shown in FIGS. 2A(iv), 2A(v), 2A(ix), and 2A(x), and FIGS. 3D and 3E, plate-shaped PANIs were formed on the rGO for x=75 and 125.

Figure 2B:
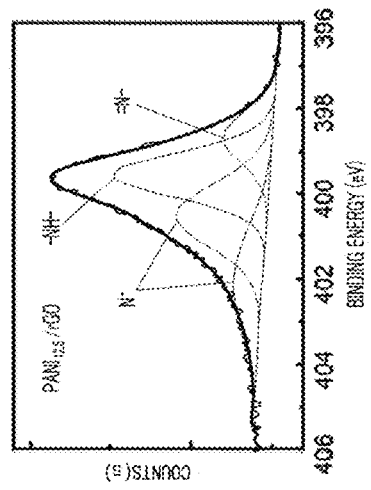

The powder X-ray diffraction (PXRD) patterns of PANI/rGO in FIG. 2B show that 23.7° and 43° peaks correspond to the (002) and (100) planes of pure rGO and 15.1°, 20.4°, and 25.2° peaks correspond to the (001), (002) and (200) planes of PANIs of an emeraldine salt form, respectively.

Figure 2C:
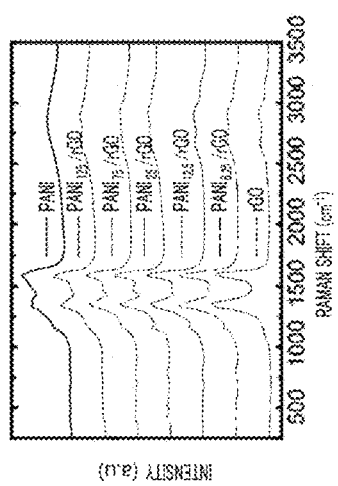

During formation of PANI$_x$/rGO, the peak at 25.2° was shown to be shifted into 24.2° to 24.7° attributed to the closer packing of the PANI chains on rGO. Further, the peak intensity of PANI/rGO composite indicates the π-π interchain interactions between PANI chains, and Raman spectra for PANI$_x$/rGO shown in FIG. 2C confirm the interaction between PAN and rGO.

Figure 2D:
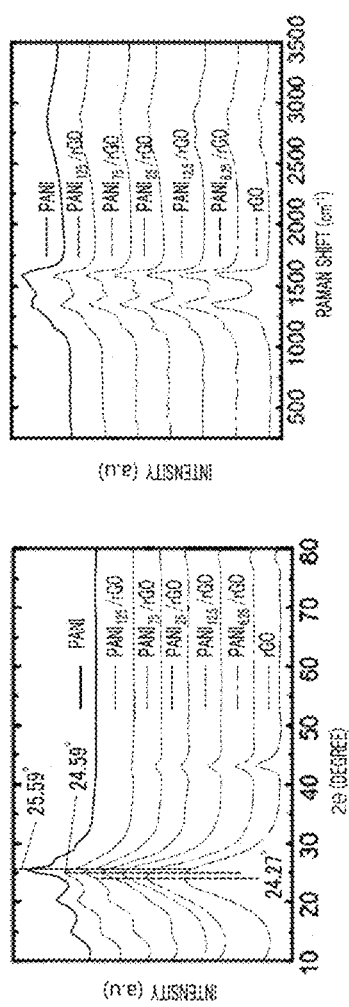
Figure 4:
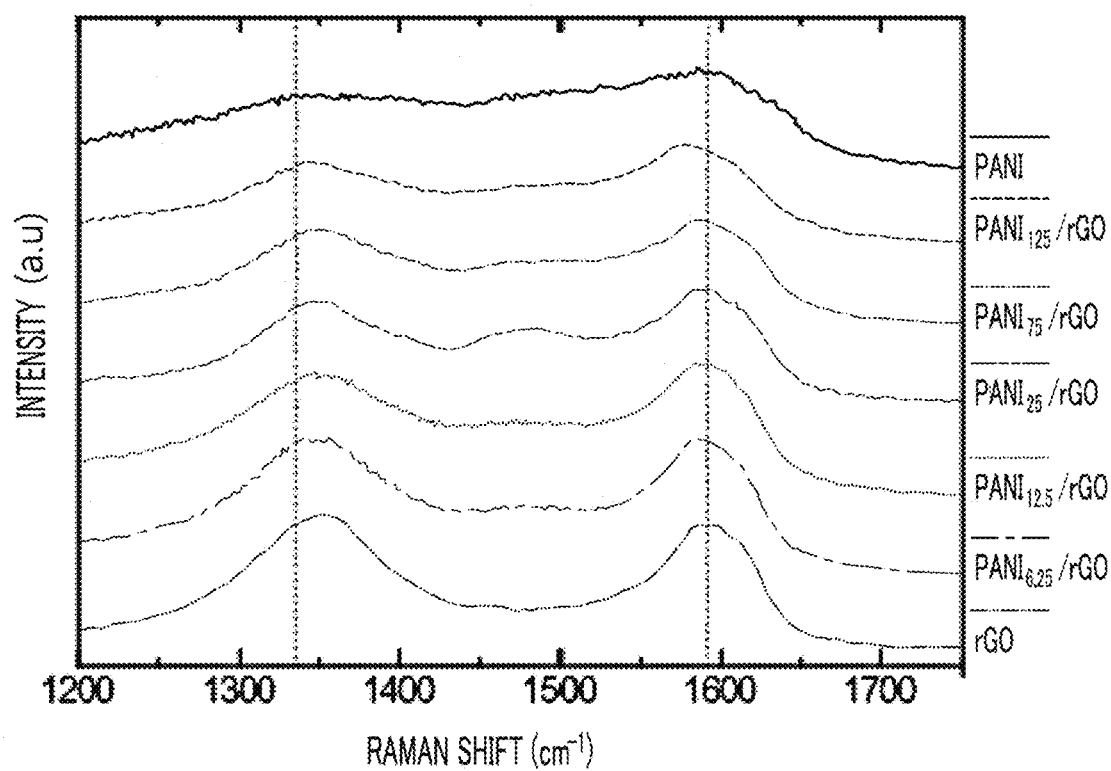
FIG. 4 shows Raman spectra (A=514 nm) of an anode material PAN Ix/rGO (x=0 to 125) in the range of from 1200 $cm^{-1}$ to 1700 $cm^{-1}$ according to an example of the present disclosure.

FIG. 4 shows Raman spectra (λ=514 nm) of an anode material PAN Ix/rGO (x=0 to 125) in the range of from 1200 cm$^{-1}$ to 1700 cm$^{-1}$ according to an example of the present disclosure: two main peaks of PANI; and Raman shift of the PANI/rGO composite at 1341 cm$^{-1}$ (vibrations of extended polymer-shaped delocalized polaron) and 1587 cm$^{-1}$ (C—C stretching of benzenoid ring): and herein, as the amount of PANI decreased, the 1587 cm$^{-1}$ peak was blue-shifted from 1581 cm$^{-1}$ (x=125) to 1581 cm$^{-1}$ (x=6.25) and the 1341 cm$^{-1}$ peak was red-shifted from 1353 cm$^{-1}$ (x=125) to 1343 cm$^{-1}$ (x=6.25). FIG. 4 shows that as the amount of the PANI in the PANI$_x$/rGO composite was decreased, the 1587 cm$^{-1}$ peak was blue-shifted but the 1341 cm$^{-1}$ peak was red-shifted. The Raman shift is caused by the π-π conjugation between PANI and rGO. The X-ray photoelectron spectroscopy (XPS) N1s spectra were compared for PANI$_x$/rGO composites as shown in FIG. 2D and the following Table 1.

TABLE 1

|  | PANI$_{6.25}$/rGO | PANI$_{12.5}$/rGO | PANI$_{25}$/rGO | PANI$_{75}$/rGO | PANI$_{125}$/rGO |
|---|---|---|---|---|---|
| N1s[at. %] | 3.57 | 6.34 | 8.74 | 9.21 | 10.68 |
| =N—[%] | 13 | 13 | 14 | 23 | 26 |
| —NH—[%] | 42 | 39 | 44 | 46 | 45 |
| N$^+$[%] | 45 | 48 | 42 | 31 | 29 |
| =N—/—NH— | 0.32 | 0.33 | 0.31 | 0.49 | 0.57 |
| N$^+$/N | 0.31 | 0.38 | 0.34 | 0.22 | 0.18 |

It can be seen from Table 1 that as the PANI chains are increased, it was confirmed that the total atomic weight % of nitrogen is increased from 3.57% to 10.68%. The XPS N1s peak is separated by imine nitrogen (=N—), amine nitrogen (—NH—) and positively charged nitrogen (N$^+$: oxidized amine and protonated amine). A good conductivity can be achieved at higher nitrogen doping levels of N$^+$/N, so that XPS N1s peak spectra provide clues for electrical performances. The PANI$_x$/rGO composite has the highest N doping level at x=12.5 equivalent to the ratio of 0.33 for =N—/—NH—, which matches with an imine:amine ratio of 1:3. The results show that a good electrical conductivity can be achieved at from x=6.25 to x=25. Meanwhile, if x is from 75 to 125 where a =N—/—NH-value increases and PANI shows a plate morphology, amines and imines are oxidized and act as defect sites and thus cause a decrease in conductivity. The results demonstrate that the ratio of aniline to oxidant in the formation of PANI polymers acts as an indicator to determine their morphologies and electrical conductivity.

As shown in Table 1, it was found that the π-π conjugation of the PANI with the rGO and the highest value of nitrogen doping level (N$^+$/N~0.38) provided high conductivity for electrons and redox ions, which induced remarkably improved electrochemical performance.

Figure 2E:
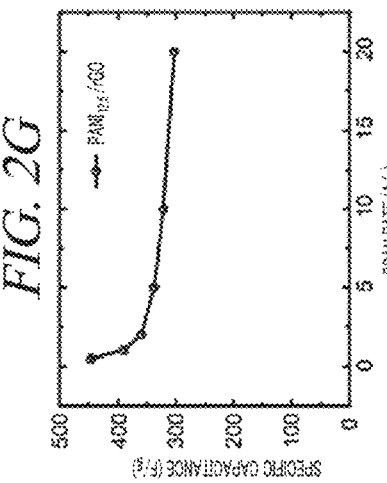
Figure 2F:
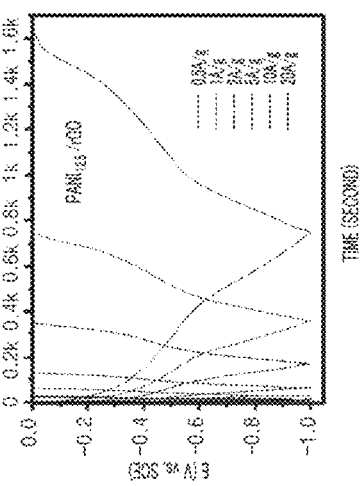
Figure 2G:
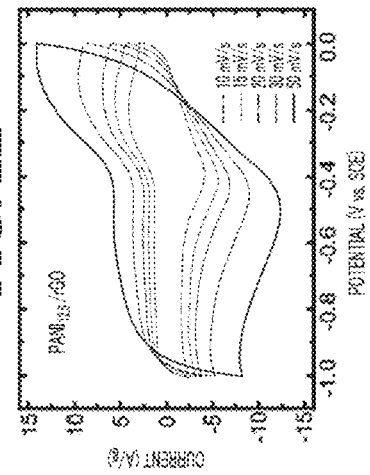

The electrochemical properties of a PANIx/rGO electrode were also measured in a three-electrode system in a 6 M KOH aqueous electrolyte. Cyclic voltammetry (CV) curves show a broad pair of redox peaks in the range of anodic potential from −1 to 0 V. FIG. 2E shows that the PANIx/rGO composite is a pseudocapacitive anode material with a high operation voltage. It is observed that the shape of the CV curve is maintained even with a high scan rate of 50 mV·s$^{-1}$, which shows that the fast Faradic reaction and efficient charge transfer occur in the anode system. FIG. 2F and FIG. 2G and the following Table 2 show that galvanostatic charge-discharge measurements at a current density of 1 Ag$^{-1}$ provided the specific capacitance of 390.7 Fg$^{-1}$ at x=12.5.

TABLE 2

|  | 0.5 Ag$^{-1}$ | 1 Ag$^{-1}$ | 2 Ag$^{-1}$ | 5 Ag$^{-1}$ | 10 Ag$^{-1}$ | 20 Ag$^{-1}$ |
|---|---|---|---|---|---|---|
| PANI$_{6.25}$/rGO | 238.4 | 211.7 | 199.2 | 176 | 141.8 | 82.6 |
| PANI$_{12.5}$/rGO | 445.7 | 390.7 | 360 | 337.5 | 321.9 | 302.8 |
| PANI$_{25}$/rGO | 266.2 | 241.1 | 224.1 | 200.5 | 173.5 | 128.1 |
| PANI$_{75}$/rGO | 226.7 | 177.3 | 146.1 | 112.9 | 85.3 | 45.4 |
| PANI$_{125}$/rGO | 117.2 | 91.4 | 74.9 | 48.6 | 23.1 | 5.2 |

As shown in Table 2, in the case of x=12.5, the specific capacitances of 445.7 Fg$^{-1}$ at 0.5 Ag$^{-1}$ and 302.8 Fg$^{-1}$ at a high current density of 20 Ag$^{-1}$ were shown to exceed those of other reported redox-reactive anode materials in an aqueous electrolyte. Fiber-like PANI structures have a large surface area and provide improved charge-transport properties by various factors such as a morphology, interaction with rGO surfaces, and N contents. Further, electrochemical performances of PANI$_{12.5}$/rGO anodes on different mass loadings of 0.879 mg·cm$^{-2}$, 1.780 mg·cm$^{-2}$, and 5.372 mg·cm$^{-2}$ at a current density of 1 Ag$^1$ show that the capacitance of 300 F at the highest mass loading is only about 25% less compared to the capacitance at about 6 times lower mass loading. This means that PANI$_{12.5}$/rGO composites for various mass loading levels can be designed as high-performance anodes for various full-cell energy storage devices.

Figure 3A:
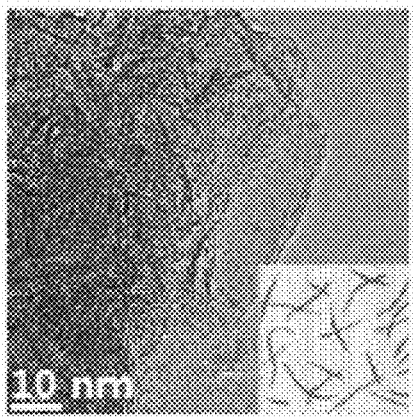
FIGS. 3A-3E show TEM images of PANIx/rGO anode materials having different amounts of PANI according to an example of the present disclosure.
Figure 3B:
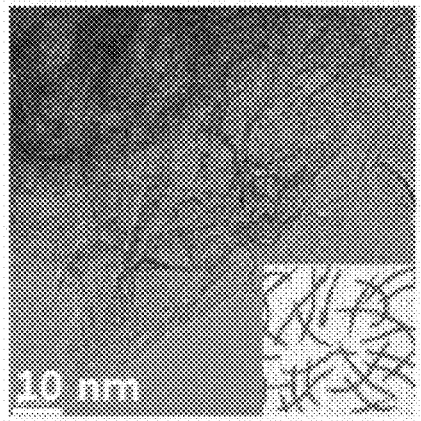
Figure 3C:
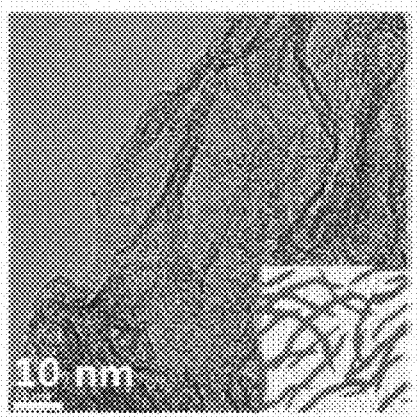
Figure 3D:
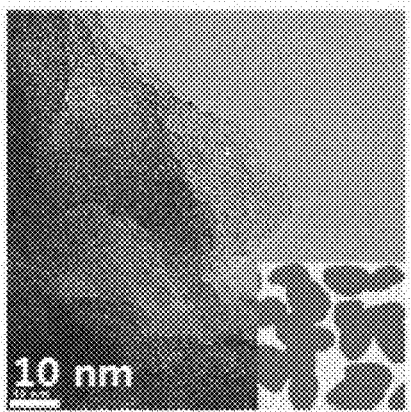
Figure 3E:
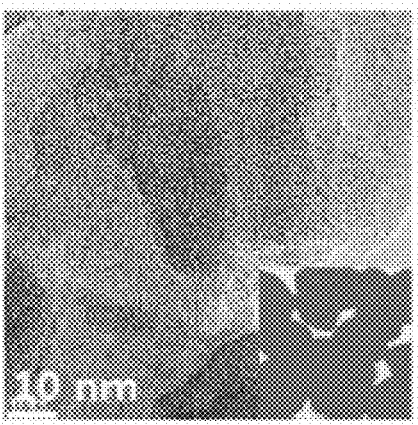
Figure 5A:
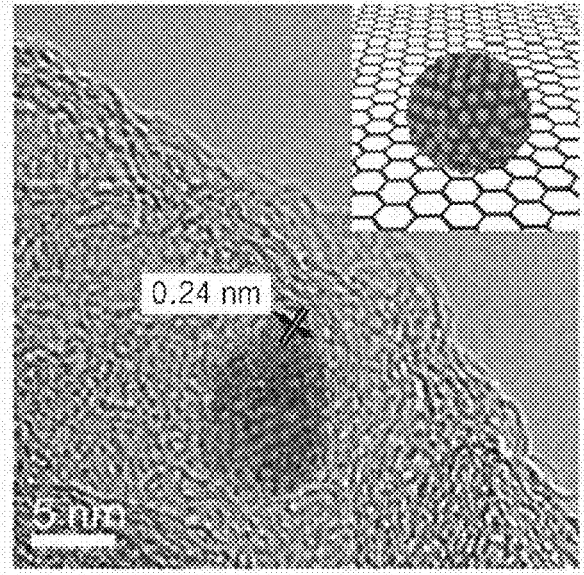
FIGS. 5A and 5B show TEM characterization according to an example of the present disclosure.
Figure 5B:
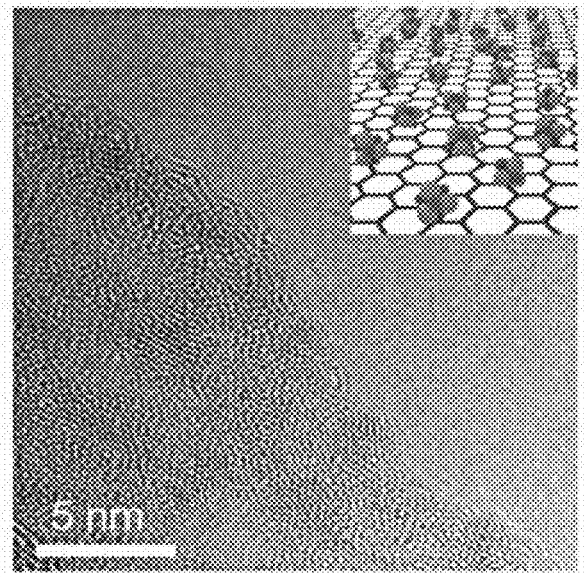
Figure 6A:
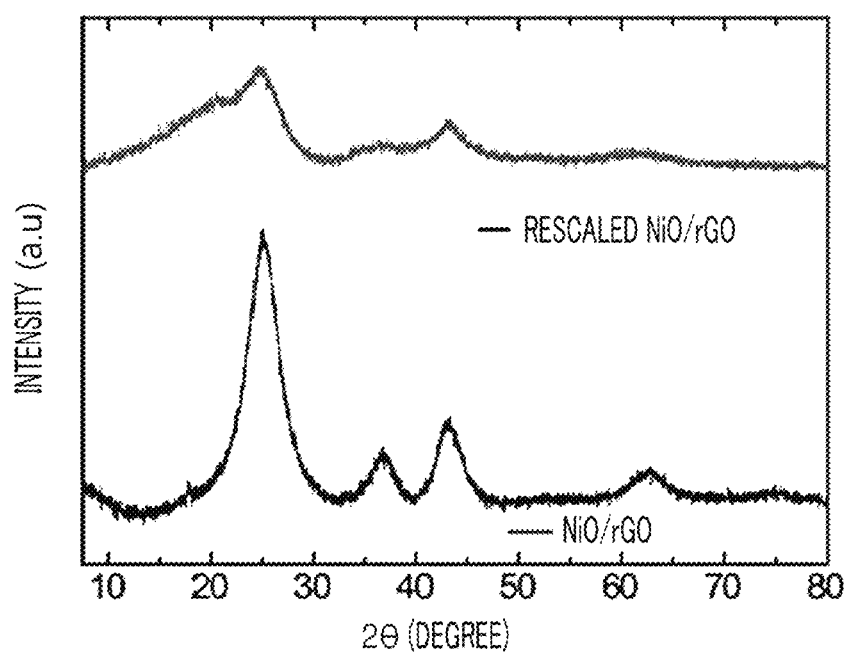
FIG. 6A shows PXRD patterns of cathode materials and FIG. 6B shows TGA for gravimetric weight percentages of NiO nanoparticles according to an example of the present disclosure (black line for before rescaling and red line for after rescaling).
Figure 6B:
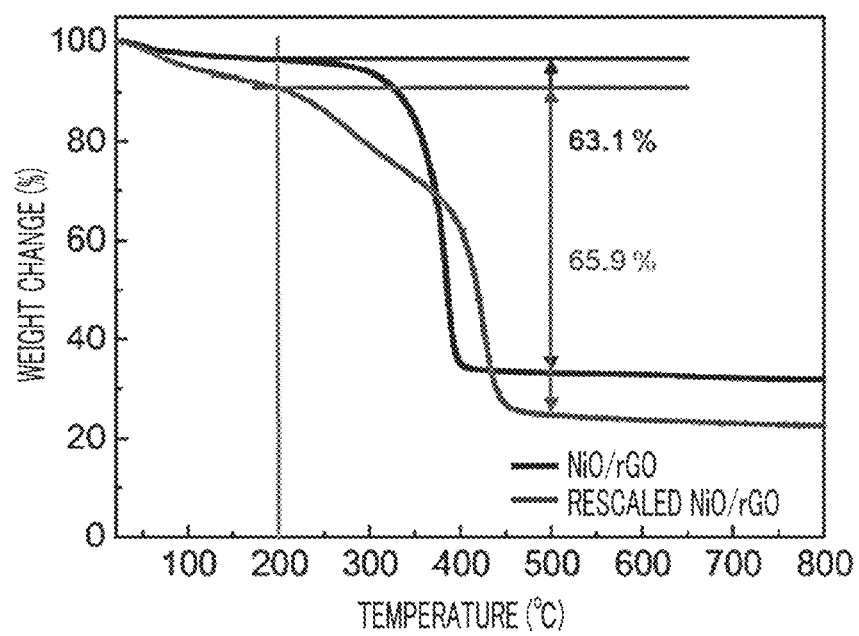

The structures and electrochemical performance on the size tuning of NiO were investigated. FIGS. 3A-3E show the morphology change of NiO nanoparticles on the rGO substrate. FIG. 5A shows that the nanoparticles have an average size of 10 nm adhered to the rGO sheet, and PXRD patterns in FIG. 6A show that the nanoparticles are in a NiO phase. The PXRD peaks at 36.8°, 42.9°, and 62.9° correspond to the (111), (200), and (220) planes. Meanwhile, FIG. 3B and FIG. 6A show that PXRD patterns of sub-nanoscale NiO particles are not clearly distinguished by extremely small sizes of particles. FIG. 6B shows that the gravimetric weight percentages of NiO particles before and after rescaling are also determined through the thermo-gravimetric analysis (TGA). Further, the XPS C1s and O1s spectra provide information about the NiO bound to the rGO. The XPS C1s spectra for C—OH/C—ONi and the XPS O1s spectra for C—O—Ni were shown to increase after rescaling, whereas the XPS O1s spectra for Ni—O were shown to decrease. This demonstrates that NiO is bound to the rGO through the C—O—Ni linkage and the C—O—Ni linkages between the NiO particles and the rGO increase after rescaling.

The STEM mapping images in FIGS. 7A-7F also show that most of nanocrystals of about 10 nm were rescaled into sub-nanoscale NiO particles of less than 1 nm. Further, Fe$_2$O$_3$ and MnO$_2$ particles also were observed as rescaled into sub-nanoscale sizes on the rGO by adopting the rescaling process for NiO/rGO. These results mean that the rescaling process can be generally applied to implement sub-nanoscale particles from various metal oxide nanoclusters, as shown in FIGS. 8A-8F.

Figure 5C:
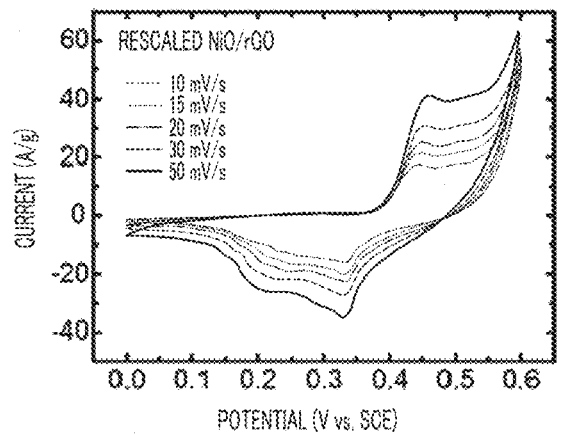
FIGS. 5C-5E show electrochemical performance of optimized cathode (rescaled NiO/rGO) according to an example of the present disclosure.
Figure 5D:
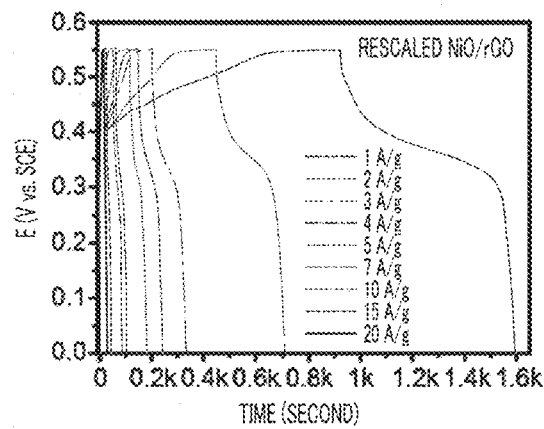
Figure 5E:
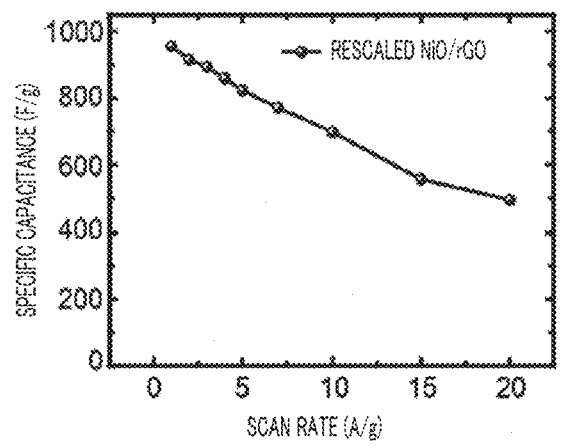

The electrochemical anion-storing properties were evaluated in a three-electrode system with 6 M KOH aqueous media. In FIG. 5C, the CV curves show a pair of redox peaks identified as the NiO particles in a potential range of from 0 V to 0.6 V. The sub-nanoscale NiO/rGO had an increased current density compared with pristine NiO/rGO and a broader redox peak. This demonstrates that the specific capacitance can be improved due to the increased active sites for atom-by-ion redox reactions. FIGS. 5D and 5E, and the following Table 3 show the galvanostatic measurement in a voltage range of 0 V to 0.55 V.

TABLE 3

|  | $1Ag^{-1}$ | $2Ag^{-1}$ | $3Ag^{-1}$ | $4Ag^{-1}$ | $5Ag^{-1}$ | $7Ag^{-1}$ | $10Ag^{-1}$ | $15Ag^{-1}$ | $20Ag^{-1}$ |
|---|---|---|---|---|---|---|---|---|---|
| NiO/rGO [$Fg^{-1}$] | 287.2 | 217.8 | 166.7 | 146.6 | 135.1 | 112.6 | 87.7 | 66.7 | 55.4 |
| Rescaled NiO/rGO [$Fg^{-1}$] | 955.7 | 914.2 | 892.4 | 858.3 | 822.8 | 770.4 | 697 | 556.2 | 494 |

As shown in Table 3, the specific capacitance of 955.7 $Fg^{-1}$ for the sub-nanoscale NiO/rGO was obtained and the specific capacitance is three or more times greater than 287.2 Fe for the pristine NiO/rGO even at a current density of 1 $A^{-1}$.

This supports that hydroxide ions (OH—) involve in atom-by-ion redox reactions using the significantly increased active sites compared to large NiO nanoparticles.

Figure 9A:
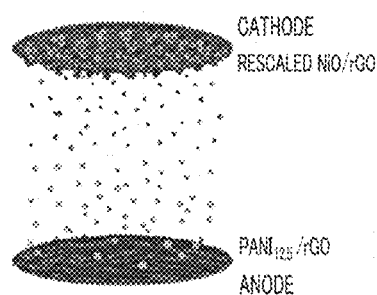
FIG. 9A is a schematic diagram of a configured AHC ($PANI_{12.5}$/rGO//rescaled NiO/rGO) according to an example of the present disclosure.
Figure 9B:
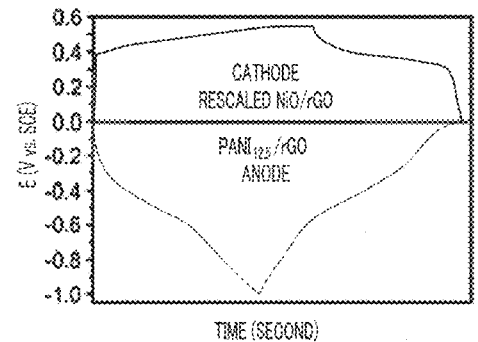
FIGS. 9B-9H show electrochemical properties of the AHC according to an example of the present disclosure.
Figure 9C:
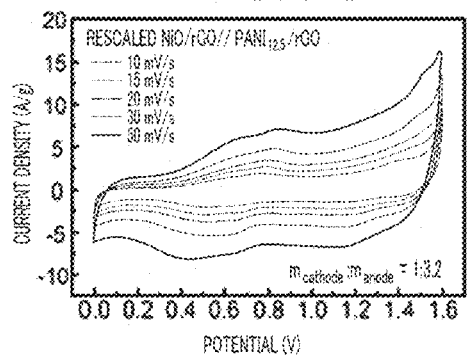
Figure 9D:
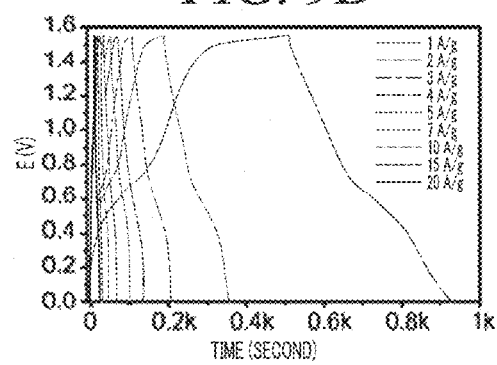
Figure 9E:
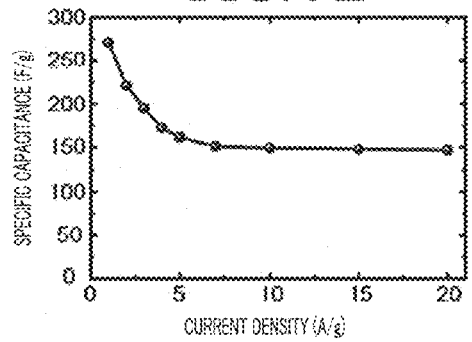

The materials for anode and cathode electrodes were assembled into a two-electrode AHC and electrochemical energy storage characteristics of the AHC were measured in 6 M KOH aqueous electrolyte. The AHC was as shown in FIG. 9A and configured with the $PANI_{12.5}$/rGO as an anode and the rescaled NiO/rGO as a cathode. The AHC was stably driven in a voltage range of from 0 V to 1.6 V, where the full operation range of the anode and the cathode was utilized, which is shown in FIG. 9B. FIG. 9C shows that the AHC was assembled by adjusting the weight ratio of $m_{cathode}$: $m_{anode}$=1:3.2 in order to balance the charges in the anode and the cathode. Two pairs of redox peaks were identified in the overall operation voltage range of the CV curves, attributed to the pseudocapacitive anode and cathode materials. As shown in FIGS. 9D and 9E, the gravimetric measurements show that the full-cell device had a discharge capacity of 270.1 $Fg^{-1}$ at a current density of 1 $Ag^{-1}$ in the operation voltage range. Further, the rate capability of the AHC shows the specific capacitance of 150.6 $Fg^{-1}$ at 7 $Ag^{-1}$ and the value of 146.6 $Fg^{-1}$ even at an extremely high current density of 20 $Ag^{-1}$. The results show that the AHC allows sufficient redox reactions at fast charging, indicating the well-matched charge-discharge kinetic balances between anode and cathode structures.

The calculated values of gravimetric specific capacitances (C), energy densities (E), and power densities (P) at various current densities of $PANI_{12.5}$/rGO//rescaled NiO/rGO AHC were as shown in the following Table 4. In Table 4, C represents capacitance stored per unit weight, E represents energy density, and P represents power density.

TABLE 4

|  | $1Ag^{-1}$ | $2Ag^{-1}$ | $3Ag^{-1}$ | $4Ag^{-1}$ | $5Ag^{-1}$ | $7Ag^{-1}$ | $10Ag^{-1}$ | $15Ag^{-1}$ | $20Ag^{-1}$ |
|---|---|---|---|---|---|---|---|---|---|
| C[$Fg^{-1}$] | 270.1 | 221 | 194.8 | 171.9 | 161.3 | 150.6 | 148.9 | 147.9 | 146.6 |
| E[$Whkg^{-1}$] | 80.9 | 66.1 | 58.2 | 51.3 | 48 | 44.7 | 44 | 43.4 | 42.8 |
| P[$Wkg^{-1}$] | 692.1 | 1391 | 2085.5 | 2777.9 | 3458.3 | 4838 | 6922.2 | 10362.3 | 13794.4 |

Figure 9F:
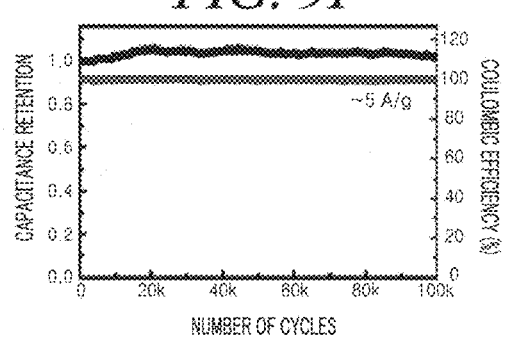
Figure 10A:
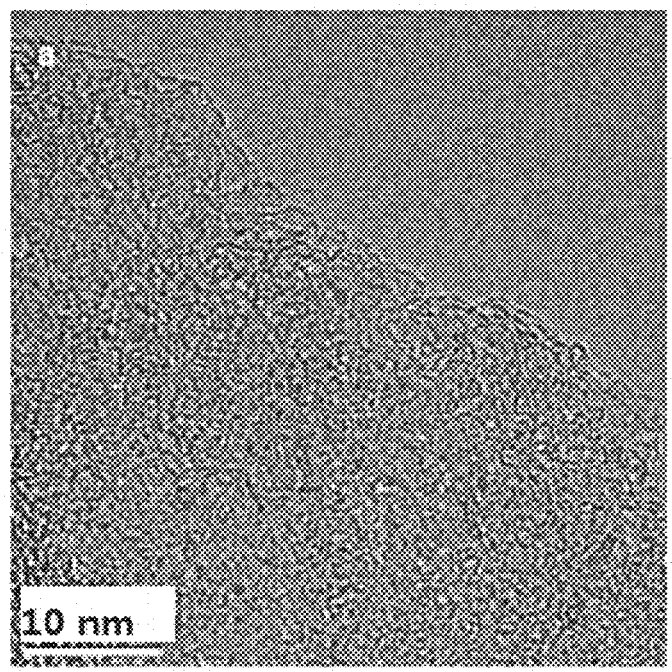
FIGS. 10A and 10B show TEM images of 10-nm NiO particles rescaled on the rGO according to an example of the present disclosure.
Figure 10B:
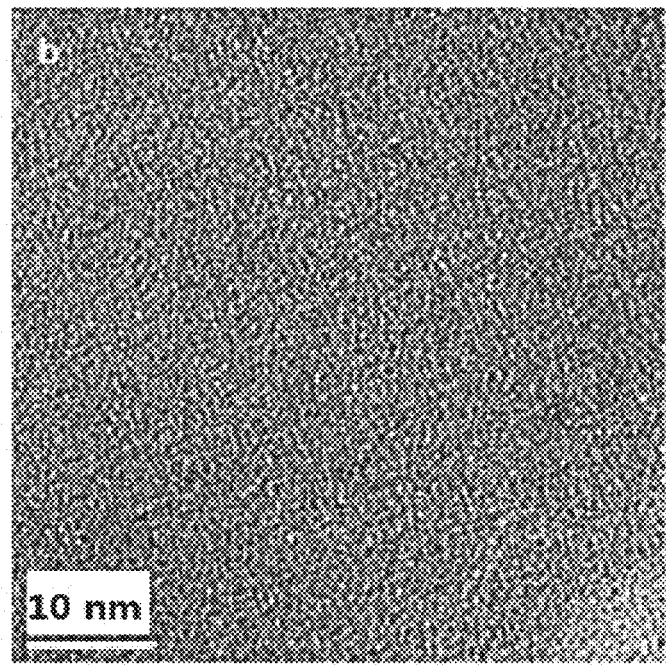

FIG. 9F shows that the cycling stability of the AHC at a current density of 5 Ag$^{-1}$ demonstrated about 100% capacitance retention and Coulombic efficiency over 100,000 redox cycles. Further, FIGS. 10A and 10B show that the morphology of sub-nanoscale NiO dispersed on the rGO in the full-cell device was observed by TEM analysis after 80,000 charge-discharge cycles, where the structure of the rescaled NiO was well maintained without being agglomerated. This is also another evidence that NiO is bound to the rGO via the strong NiO—C linkage after rescaling.

Figure 9G:
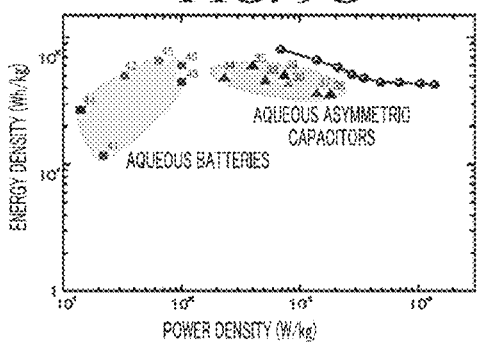

FIG. 9G shows Ragone plots for energy storage performance of the AHC according to an Example of the present disclosure at different current densities in comparison with other conventional AHCs (indicated by numbers and triangles) and conventional aqueous batteries (indicated by numbers and squares). The Comparative Examples (indicated by numbers) shown in FIG. 9G are as shown below and relevant references are also described:

<The Conventional AHCs (Indicated by Triangles)>
30: NiO-encapsulated nitrogen-rich carbon hollow porous spheres/MG [S. Y. Kim, H. M. Jeong, J. H. Kwon, I. W. Ock, W. H. Suh, G. D. Stucky, J. K. Kang, *Energy Environ. Sci.* 2015, 8, 188]
34: NiCo$_2$O$_4$/rGO//HFAC [Z. Li, Z. W. Xu, H. L. Wang, J. Ding, B. Zahiri, C. M. B. Holt, X. H. Tan, D. Mitlin, *Energy Environ. Sci.* 2014, 7, 1708]
35: NiCoAl-LDH NP/NiCo carbonate hydroxide-NW//AC [J. Yang, C. Yu, X. M. Fan, J. S. Qiu, *Adv. Energy Mater.* 2014, 4, 1400761]
36: Ni(OH)$_2$/CNT//rGO [R. R. Salunkhe, J. J. Lin, V. Malgras, S. X. Dou, J. H. Kim, Y. Yamauchi, *Nano Energy* 2015, 11, 211]
37: nanoporous Co$_3$O$_4$//AC [R. R. Salunkhe, J. Tang, Y. Kamachi, T. Nakato, J. H. Kim, Y. Yamauchi, *ACS Nano* 2015, 9, 6288]
38: NiCo$_2$S$_4$/N-doped C foam//mesoporous C [L. F. Shen, J. Wang, G. Y. Xu, H. S. Li, H. Dou, X. G. Zhang, *Adv. Energy Mater.* 2015, 5, 1400977]
39: NiCoS/G//porous C nanosheet) C [J. Yang, C. Yu, X. M. Fan, S. X. Liang, S. F. Li, H. W. Huang, Z. Ling, C. Hao, J. S. Qiu, *Energy Environ. Sci.* 2016, 9, 1299];

<The Conventional Aqueous Batteries (Indicated by Squares)>
40: LiMn$_2$O$_4$//LiTi$_2$(PO$_4$)$_3$ [J. Y. Luo, Y. Y. Xia, *Adv. Funct. Mater.* 2007, 17, 3877]
41: PbO$_2$//AC [N. F. Yu, L. J. Gao, S. H. Zhao, Z. D. Wang, *Electrochim. Acta* 2009, 54, 3835]
42: LiFePO$_4$//LiTi$_2$(PO$_4$)$_3$ [J. Y. Luo, W. J. Cui, P. He, Y. Y. Xia, *Nat. Chem.* 2010, 2, 760]
43: CuHCF//AC/PPy [M. Pasta, C. D. Wessells, R. A. Huggins, Y. Cui, *Nat. Commun.* 2012, 3, 1149]
44: CuHCF//MnHCMn [M. Pasta, C. D. Wessells, N. Liu, J. Nelson, M. T. McDowell, R. A. Huggins, M. F. Toney, Y. Cui, *Nat. Commun.* 2014, 5, 3007]
45: 5 M LiI//PNTCDA [X. L. Dong, L. Chen, J. Y. Liu, S. Haller, Y. G. Wang, Y. Y. Xia, *Sci. Adv.* 2016, 2, e1501038].

Figure 11:
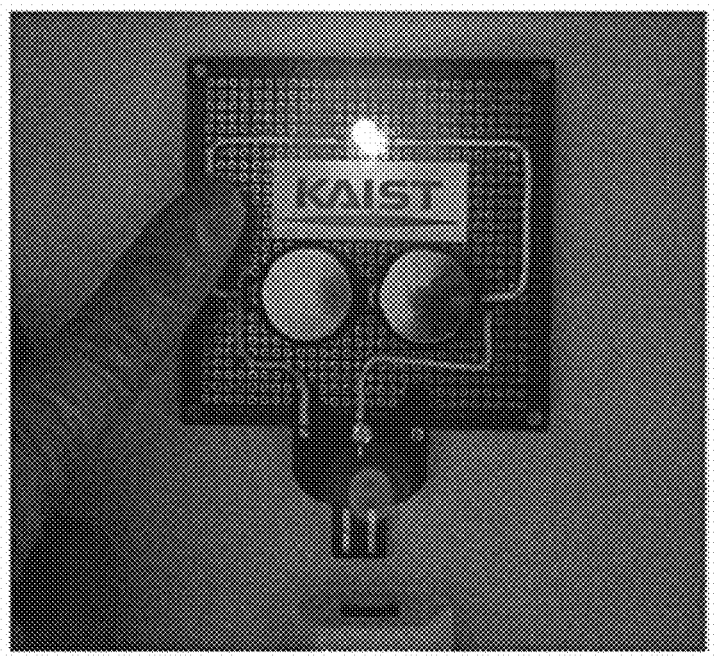
FIG. 11 shows an LED powered by two AHCs connected in series and charged with a USB switching coin cell charger for 10 seconds according to an example of the present disclosure.
Figure 12:
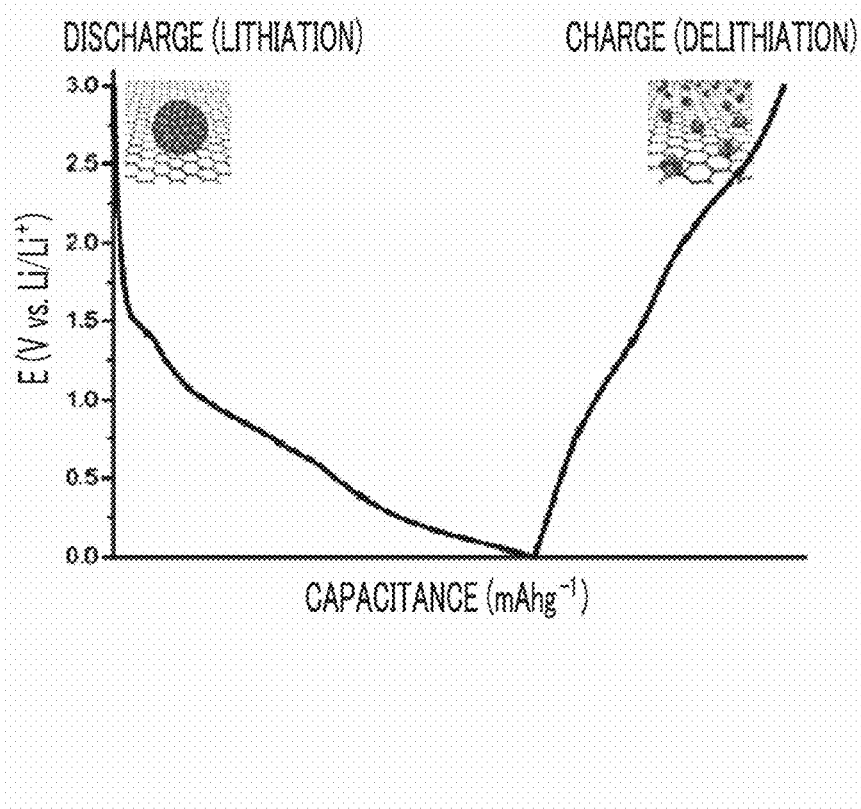
FIG. 12 shows a galvanostatic discharge-charge profile of lithium-induced rescaling on NiO according to an example of the present disclosure.

As confirmed in FIG. 9G, the AHC has the highest energy density close to 81 Wh·kg$^{-1}$, outperforming performances of asymmetric capacitors with aqueous electrolytes and aqueous batteries. In addition, the results demonstrate that its power density of 13,794 W·kg$^{-1}$ exceeds by about 100 times those of the aqueous batteries. Actually, two coin cells assembled in series are demonstrated by the flexible photovoltaic-charging wearable kit (~20 seconds) and USB switching charger (~10 seconds) to power an LED, as shown in FIG. 9H, FIG. 11 and FIG. 12.

Figure 9H:
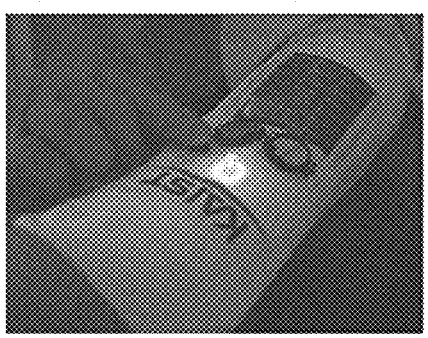

FIG. 9H shows an LED powered by two AHCs connected in series and charged with the flexible photovoltaic-charging wearable kit coin cell charger for 20 seconds according to an example of the present disclosure. FIG. 11 shows an LED powered by two AHCs connected in series and charged with a USB switching coin cell charger for 10 seconds according to an example of the present disclosure. FIG. 12 shows a galvanostatic discharge-charge profile of lithium-induced rescaling on NiO according to an example of the present disclosure, where particles having a size of 10 nm were dispersed as atomic unit particles as shown in the inset of FIG. 12 by the electrochemical method. This phenomenon occurs when lithium ions inserted into metal oxide are desorbed, and a voltage was lowered (3 V→0 V) to insert meatal into nanoparticles and applied (0 V→3 V) to desorb the inserted lithium ions. As demonstrated in the present Example, an aqueous hybrid capacitor using an anode including conductive polymer chains formed on a graphene sheet and a cathode including sub-nanoscale particles of a metal oxide or metal sulfide formed on a graphene sheet can achieve a high power density that enables ultrafast charging.

The above description of the present disclosure is provided for the purpose of illustration, and it would be understood by a person with ordinary skill in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. An aqueous hybrid capacitor, comprising:
    an anode comprising conductive polymer chains formed on a graphene sheet, a weight ratio of the graphene sheet to the conductive polymer chains being from 1:0.01 to 1:0.2;
    a cathode comprising sub-nanoscale particles of a metal oxide or metal sulfide formed on a graphene sheet; and
    an aqueous electrolyte.

2. The aqueous hybrid capacitor according to claim 1, wherein the conductive polymer chains have a form of fiber.

3. The aqueous hybrid capacitor according to claim 1, wherein the conductive polymer chains include a conductive polymer selected from the group consisting of polyanilines, polypyrroles, polythiophenes, poly[3-methylthiophene], poly[3,4-ethylendioxythiophene](PEDOT), and derivatives thereof.

4. The aqueous hybrid capacitor according to claim 1, wherein the sub-nanoscale particles include the oxide or sulfide containing at least one metal element selected from the group consisting of Ni, Fe, Co, Ge, Sn, Mn, Ti, V, Cu, Zn, W, Ag, Pt, Ga, P, Au, Sb, Te, Pb, Bi, Mo and Cd.

5. The aqueous hybrid capacitor according to claim 1, wherein a weight ratio of the graphene sheet to the sub-nanoscale particles in the cathode is from 1:0.01 to 1:0.5.

6. The aqueous hybrid capacitor according to claim 2, wherein a width of the fiber of the conductive polymer chains is from 1 nm to 10 nm.

7. A pseudocapacitive conductive composite, comprising: conductive polymer chains formed on a graphene sheet, wherein a weight ratio of the graphene sheet to the conductive polymer chains is from 1:0.01 to 1:0.2.

8. The pseudocapacitive conductive composite according to claim 7, wherein the conductive polymer chains have a fiber form.

9. The pseudocapacitive conductive composite according to claim 7, wherein the conductive polymer chains include a conductive polymer selected from the group consisting of polyanilines, polypyrroles, polythiophenes, poly[3-methylthiophene], poly[3,4-ethylendioxythiophene](PEDOT), and derivatives thereof.

10. The pseudocapacitive conductive composite according to claim 7, wherein the conductive composite is prepared by in-situ polymerization of the conductive polymer forming monomer on a graphene sheet.

11. The pseudocapacitive conductive composite according to claim 7, wherein a width of the fiber of the conductive polymer chains is from 1 nm to 10 nm.

* * * * *